(12) United States Patent
Lesesky

(10) Patent No.: US 8,232,871 B2
(45) Date of Patent: Jul. 31, 2012

(54) SYSTEM, APPARATUS AND METHODS FOR DATA COMMUNICATION BETWEEN VEHICLE AND REMOTE DATA COMMUNICATION TERMINAL, BETWEEN PORTIONS OF VEHICLE AND OTHER PORTIONS OF VEHICLE, BETWEEN TWO OR MORE VEHICLES, AND BETWEEN VEHICLE AND COMMUNICATIONS NETWORK

(75) Inventor: Alan C. Lesesky, Charlotte, NC (US)

(73) Assignee: Innovative Global Systems, LLC SC (US)

( * ) Notice: Subject to any disclaimer, the term of this patent is extended or adjusted under 35 U.S.C. 154(b) by 0 days.

(21) Appl. No.: 12/925,306

(22) Filed: Oct. 19, 2010

(65) Prior Publication Data
US 2011/0037579 A1 Feb. 17, 2011

Related U.S. Application Data

(63) Continuation of application No. 12/291,586, filed on Nov. 12, 2008, now Pat. No. 7,817,019, which is a continuation of application No. 11/376,417, filed on Mar. 15, 2006, now Pat. No. 7,449,993, which is a continuation-in-part of application No. 10/007,032, filed on Nov. 8, 2001, now Pat. No. 6,608,554, which is a continuation of application No. 09/569,995, filed on May 12, 2000, now Pat. No. 6,411,203, which is a continuation of application No. 08/907,861, filed on Aug. 8, 1997, now Pat. No. 6,064,299, and a continuation-in-part of application No. 08/594,255, filed on Jan. 30, 1996, now Pat. No. 6,111,524, which is a continuation-in-part of application No. 08/554,907, filed on Nov. 9, 1995, now abandoned.

(51) Int. Cl.
G08B 21/00 (2006.01)

(52) U.S. Cl. ........................................ 340/431; 340/933

(58) Field of Classification Search .................. 340/431, 340/435, 438, 442, 449, 463, 475, 928, 933, 340/942, 944; 307/9.1, 10.1; 280/232, 441.1; 701/33, 35; 702/45
See application file for complete search history.

(56) References Cited

U.S. PATENT DOCUMENTS
2,379,664 A 7/1945 Stanko
(Continued)

FOREIGN PATENT DOCUMENTS
EP 0546370 A1 6/1993
(Continued)

OTHER PUBLICATIONS

Ferrone, Christopher W.; "Global Vehicle Tracking and Computerized Vehicle Diagnostic: A Conceptual Discussion of a Future Integration", 1992.
(Continued)

Primary Examiner — Van T. Trieu
(74) Attorney, Agent, or Firm — Schwartz Law Firm, P.C.

(57) ABSTRACT

A system, an apparatus, and methods are provided for data communications associated with a vehicle. The apparatus preferably includes at least one electronic subsystem associated with the vehicle and a plurality of electrical conductors connected to the at least one electronic subsystem and associated with the vehicle. A vehicle data communications protocol converter is preferably connected to the plurality of electrical conductors for converting a first data communications protocol associated with data communications along the plurality of electrical conductors to a second data communications protocol such as an infrared, an RF data, an Internet, or other network communications protocol. The apparatus also preferably includes a transceiver connected to the data communications protocol converter for transmitting the second data communications protocol from the vehicle and receiving the data communications protocol from another portion of the vehicle, a remote data communications terminal, another vehicle, or another communications network.

20 Claims, 33 Drawing Sheets

U.S. PATENT DOCUMENTS

| | | |
|---|---|---|
| 2,483,815 A | 10/1949 | Easton |
| 3,154,360 A | 10/1964 | Plishner |
| 3,184,703 A | 5/1965 | Piscitello et al. |
| 3,387,606 A | 6/1968 | Crafts et al. |
| 3,705,986 A | 12/1972 | Sanders et al. |
| 4,041,470 A | 8/1977 | Slane et al. |
| 4,104,630 A | 8/1978 | Chasek |
| 4,207,468 A | 6/1980 | Wilson |
| 4,236,255 A | 11/1980 | Burgener et al. |
| 4,287,505 A | 9/1981 | Ohmori et al. |
| 4,313,228 A | 1/1982 | Berstein |
| 4,325,146 A | 4/1982 | Lennington |
| 4,328,494 A | 5/1982 | Goodall |
| 4,398,172 A | 8/1983 | Carroll et al. |
| 4,506,386 A | 3/1985 | Ichikawa et al. |
| 4,624,472 A | 11/1986 | Stuart et al. |
| 4,641,322 A | 2/1987 | Hasegawa |
| 4,715,012 A | 12/1987 | Mueller, Jr. |
| 4,733,919 A | 3/1988 | Jacobs et al. |
| 4,735,461 A | 4/1988 | Moller et al. |
| 4,752,899 A | 6/1988 | Newman et al. |
| 4,767,181 A | 8/1988 | McEowen |
| 4,772,209 A | 9/1988 | Muncey |
| 4,804,937 A | 2/1989 | Barbiaux et al. |
| 4,804,938 A | 2/1989 | Rouse et al. |
| 4,809,177 A | 2/1989 | Windle et al. |
| 4,838,797 A | 6/1989 | Dodier |
| 4,839,531 A | 6/1989 | Stemmons et al. |
| 4,864,589 A | 9/1989 | Endo |
| 4,897,642 A | 1/1990 | Dilullo et al. |
| 4,926,170 A | 5/1990 | Beggs et al. |
| 4,926,331 A | 5/1990 | Windle et al. |
| 4,952,908 A | 8/1990 | Sanner |
| 4,969,839 A | 11/1990 | Nilsson |
| 4,996,719 A | 2/1991 | Okazaki et al. |
| 5,025,253 A | 6/1991 | DiLullo et al. |
| 5,081,667 A | 1/1992 | Drori et al. |
| 5,090,024 A | 2/1992 | Vander Mey et al. |
| 5,090,779 A | 2/1992 | Kramer |
| 5,142,278 A | 8/1992 | Moallemi et al. |
| 5,263,046 A | 11/1993 | Vander Mey |
| 5,268,666 A | 12/1993 | Michel et al. |
| 5,278,862 A | 1/1994 | Vander Mey |
| 5,347,274 A | 9/1994 | Hassett |
| 5,359,625 A | 10/1994 | Vander Mey et al. |
| 5,379,042 A | 1/1995 | Henoch |
| 5,381,449 A | 1/1995 | Jasper et al. |
| 5,385,476 A | 1/1995 | Jasper |
| 5,397,924 A | 3/1995 | Gee et al. |
| 5,442,553 A | 8/1995 | Parrillo |
| 5,442,810 A | 8/1995 | Jenquin |
| 5,446,470 A | 8/1995 | Avignon et al. |
| 5,488,352 A | 1/1996 | Jasper |
| 5,524,034 A | 6/1996 | Srygley et al. |
| 5,570,087 A | 10/1996 | Lemelson |
| 5,581,246 A | 12/1996 | Yarberry et al. |
| 5,587,890 A | 12/1996 | Happ et al. |
| 5,677,667 A | 10/1997 | Lesesky et al. |
| 5,716,071 A | 2/1998 | Stanley et al. |
| 5,732,074 A | 3/1998 | Spaur et al. |
| 5,739,592 A | 4/1998 | Rigsby |
| 5,771,459 A | 6/1998 | Demery et al. |
| 5,783,993 A | 7/1998 | Briski et al. |
| 5,790,536 A | 8/1998 | Mahany et al. |
| 5,794,164 A | 8/1998 | Beckert et al. |
| 5,798,577 A | 8/1998 | Lesesky et al. |
| 5,802,545 A | 9/1998 | Coverdill |
| 5,818,127 A | 10/1998 | Abraham |
| 5,825,287 A | 10/1998 | Zarybnicky, Sr. et al. |
| 5,844,473 A | 12/1998 | Kaman |
| 5,852,405 A | 12/1998 | Yoneda et al. |
| D403,659 S | 1/1999 | Lesesky |
| D404,170 S | 1/1999 | Lesesky |
| 5,884,202 A | 3/1999 | Arjomand |
| 5,900,803 A | 5/1999 | Politz |
| 5,913,180 A | 6/1999 | Ryan |
| 5,917,632 A | 6/1999 | Lesesky |
| 6,025,563 A | 2/2000 | Lesesky et al. |
| 6,064,299 A | 5/2000 | Lesesky et al. |
| 6,089,588 A | 7/2000 | Lesesky et al. |
| 6,094,609 A | 7/2000 | Arjomand |
| 6,111,524 A | 8/2000 | Lesesky et al. |
| 6,127,939 A | 10/2000 | Lesesky et al. |
| D434,006 S | 11/2000 | Lesesky et al. |
| 6,150,793 A | 11/2000 | Lesesky et al. |
| 6,254,201 B1 | 7/2001 | Lesesky et al. |
| 6,352,137 B1 | 3/2002 | Stegall et al. |
| 6,378,959 B2 | 4/2002 | Lesesky et al. |
| 6,411,203 B1 | 6/2002 | Lesesky et al. |
| 6,430,485 B1 | 8/2002 | Hullinger |
| 6,608,554 B2 | 8/2003 | Lesesky et al. |
| 6,744,352 B2 | 6/2004 | Lesesky et al. |
| 6,772,248 B1 | 8/2004 | McClure et al. |
| 7,449,993 B2 | 11/2008 | Lesesky et al. |

FOREIGN PATENT DOCUMENTS

| | | |
|---|---|---|
| EP | 0 744 322 A2 | 11/1996 |
| EP | 0 802 082 A2 | 10/1997 |
| JP | 52-33092 | 3/1977 |
| WO | WO 93/22848 | 11/1993 |
| WO | WO 94/12962 | 6/1994 |
| WO | WO 97/17232 | 5/1997 |
| WO | WO 97/28988 A1 | 8/1997 |
| WO | WO 98/34812 | 8/1998 |
| WO | WO 98/37432 | 8/1998 |
| WO | WO 99/06987 | 2/1999 |
| WO | WO 99/21383 | 4/1999 |
| WO | WO 99/35009 | 7/1999 |

OTHER PUBLICATIONS

International Truck and Bus Meeting and Exposition, Nov. 16-19, 1992; SAE Technical Paper Series 922498; 11 pages.

Translation of article entitled "Materialflub per Infrarot," Technische Rundschau, 1990.

IEE Spectrum, vol. 31, No. 6, Jun. 1994, pp. 49-55.

Echelon's LonWorks Products Data Book, 1995-1996 Edition.

Echelon's LonWorks Custom Node Development, LonWorks Engineering Bulletin dated Apr. 1993.

Serial Data Communications Between Microcomputer Systems in Heavy Duty Vehicle Applications—SAE J1708 Jun. 1987.

Society of Automotive Engineers, Inc., SAE J560 Specification, Jun. 1993.

System 86 Products Train Applications, Specification Manual from Morrison Knudsen, Morrison Knudsen's Advanced Systems Division, pp. 2-3, 13, 40, Dec. 31, 1994.

"Communications Engineers Reference Book," edited by Fraidoon Mazda, Buttersworth-Heineman, 1st Ed. 1993.

PCT International Search Report, PCT/US96/16580, Mar. 13, 1997.

Qualcomm Incoporated; OmniTracs® Customer Service Bulletin 0017; Oct. 4, 1990; pp. 1-6.

Vehicle Electronic Systems for the 1990s; Kopec, James W.; Presented to S.12 Mini-Tech session, TMC '91; pp. 1-11.

Qualcomm OmniTracs System; J1708/J1587 Application Document; Feb. 6, 1995; pp. 1-7.

Technical Overview; OmniTracs®; Sep. 1992; pp. 1-22.

SAE The Engineering Society for Advancing Mobility Land Sea Air and Space; A product of the Cooperative Engineering Program; SAE 1708 JUN87; "Truck and Bus Practice"; Jun. 1987; pp. 1-12.

Vesplex; "Proposed Industry Standard for Tractor/Trailer Communications"; Lesesky, Alan C., Vehicle Enhancement Systems, Inc. (VES); Sep. 1, 1993; pp. 1-15.

Technical Overview; OmniTracs®; Apr. 1995; pp. 1-21.

SensorTracs Installation Guide; OmniTracs; Jun. 1992; pp. 1-56.

"Communications Revolution in Trucking"; Cross, Rich; Commerical Carrier Journal Mar. 1991; pp. 1-67.

SensorTracs Installation Guide; OmniTracs; Feb. 1992; pp. 1-58.

SensorTracs Installation Guide; OmniTracs; Jun. 1993; pp. 1-55.

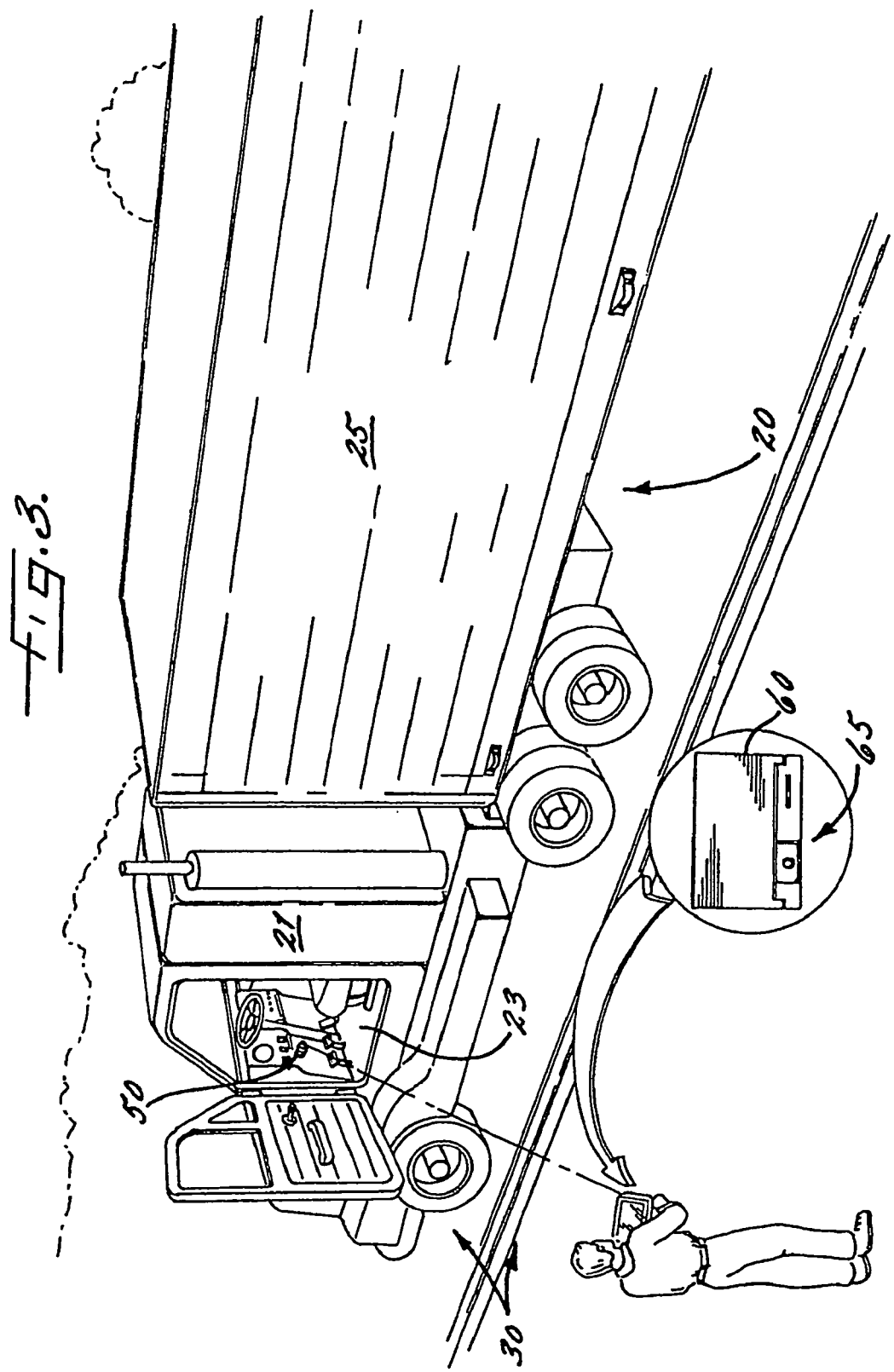

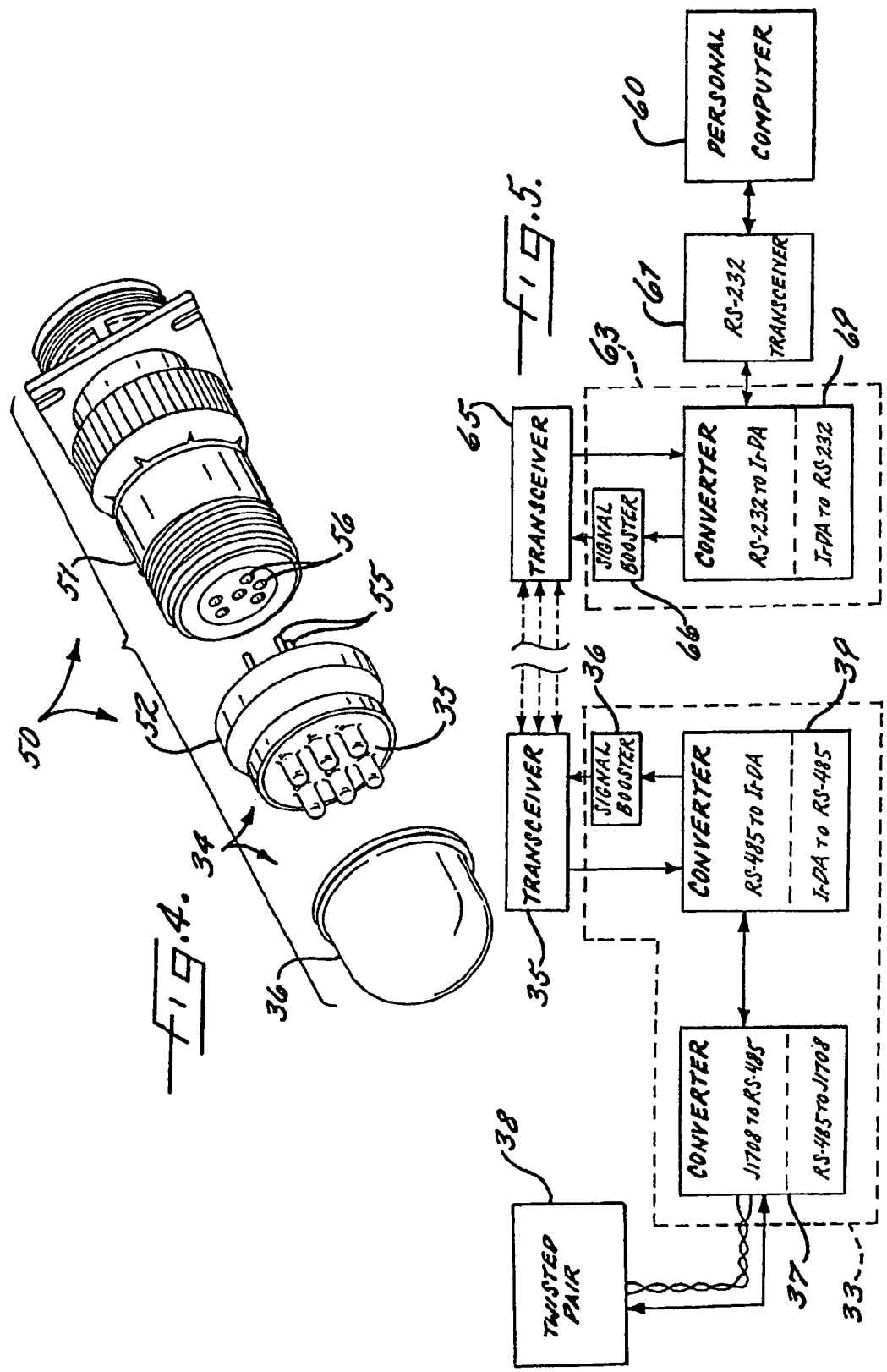

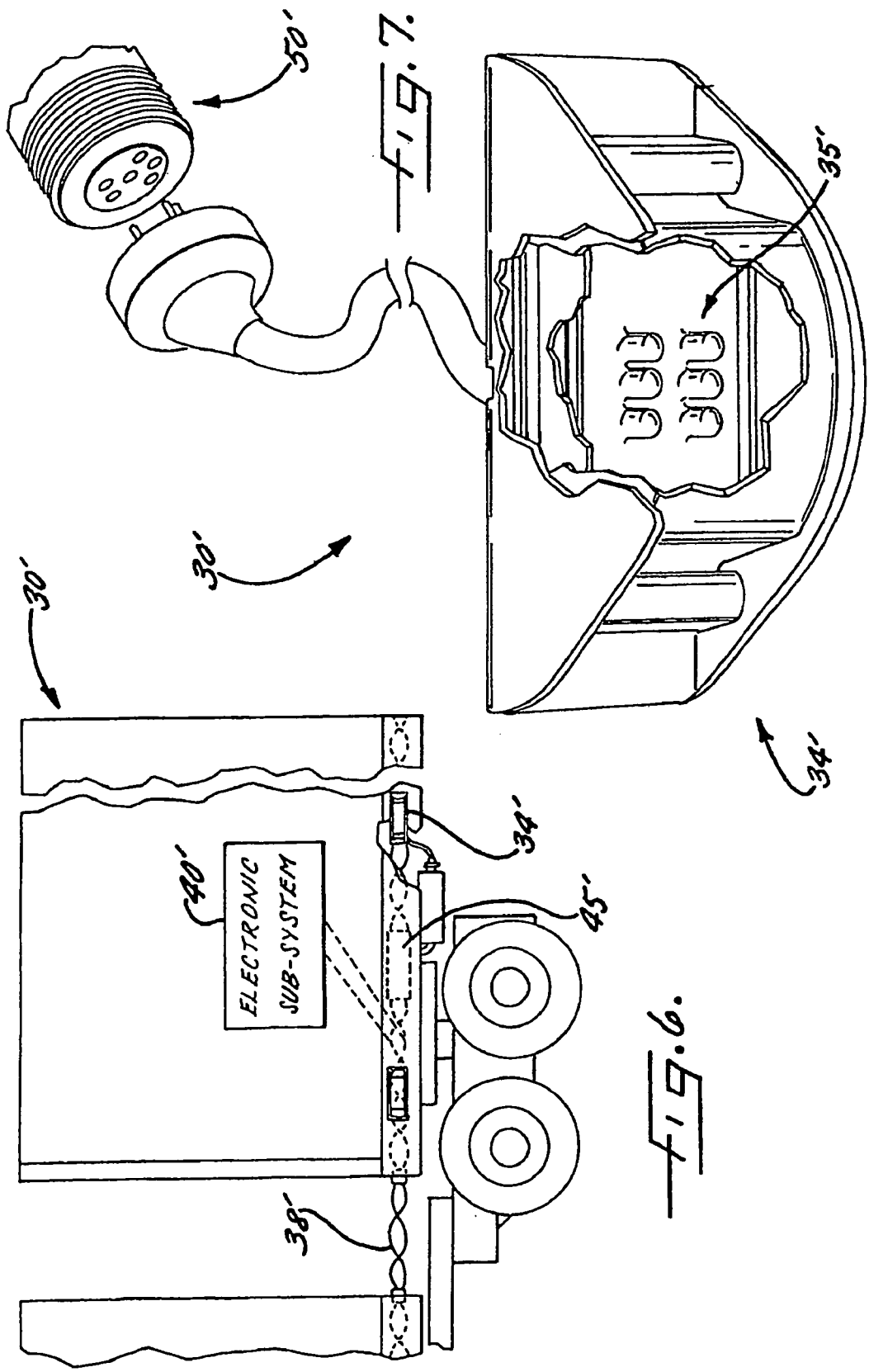

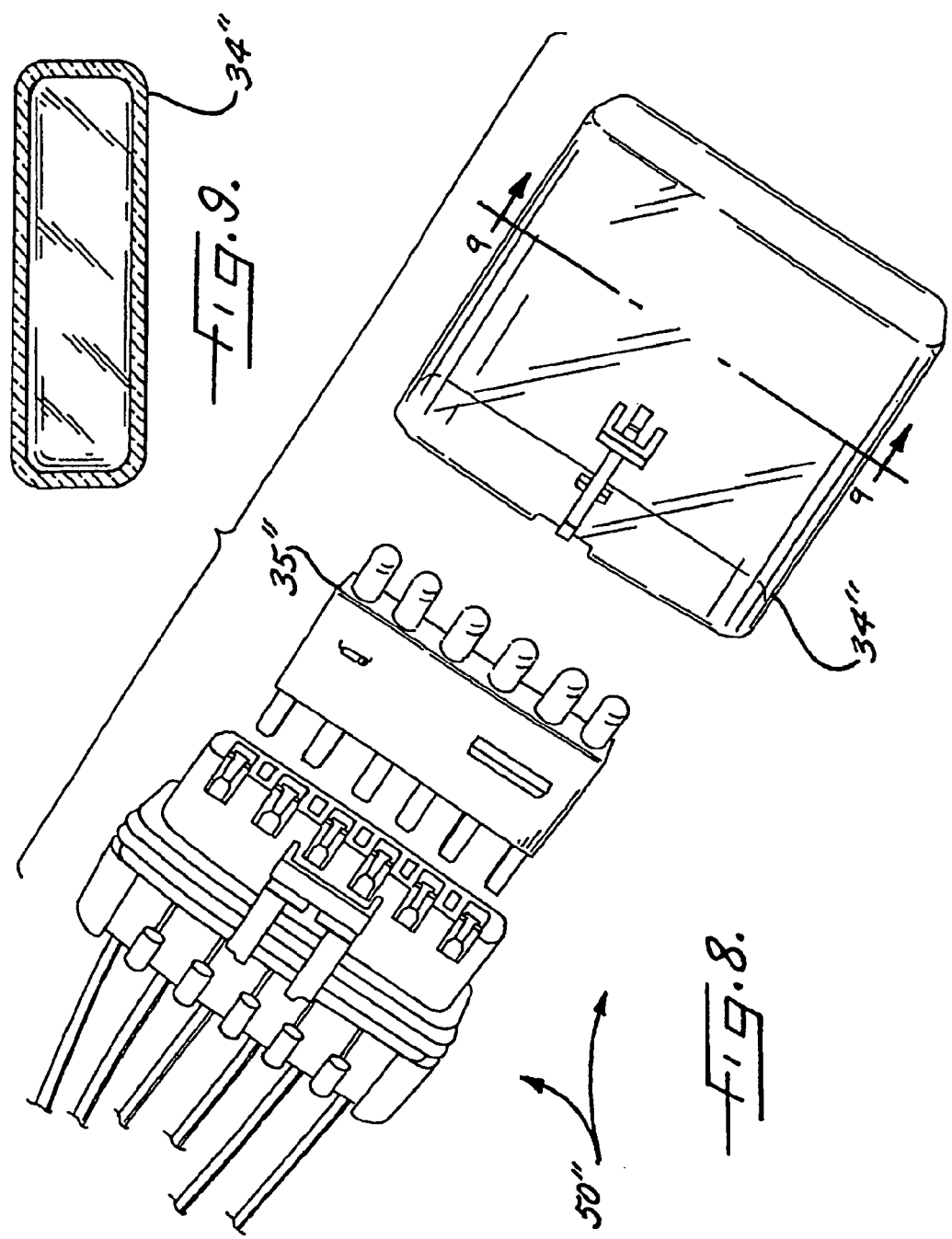

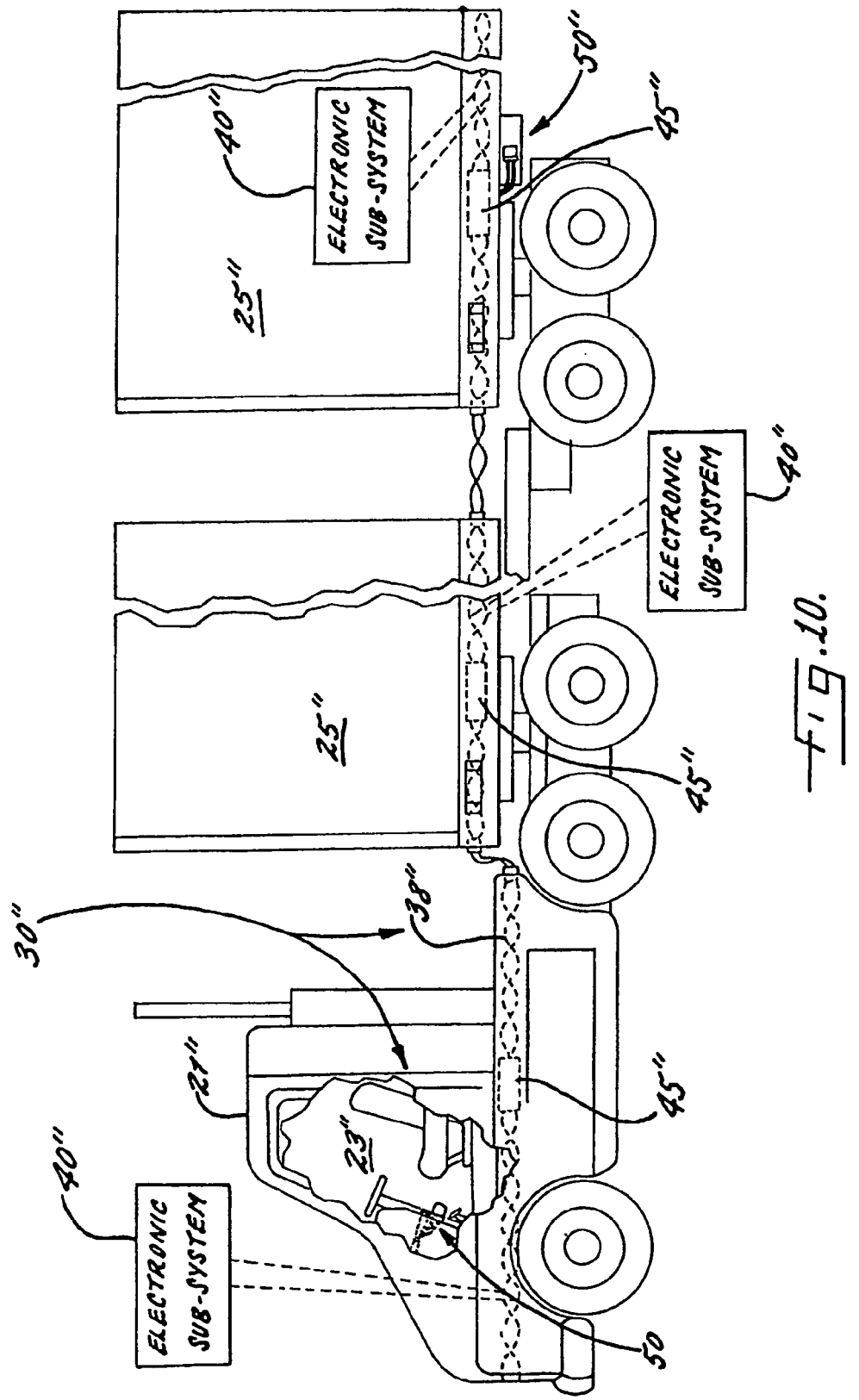

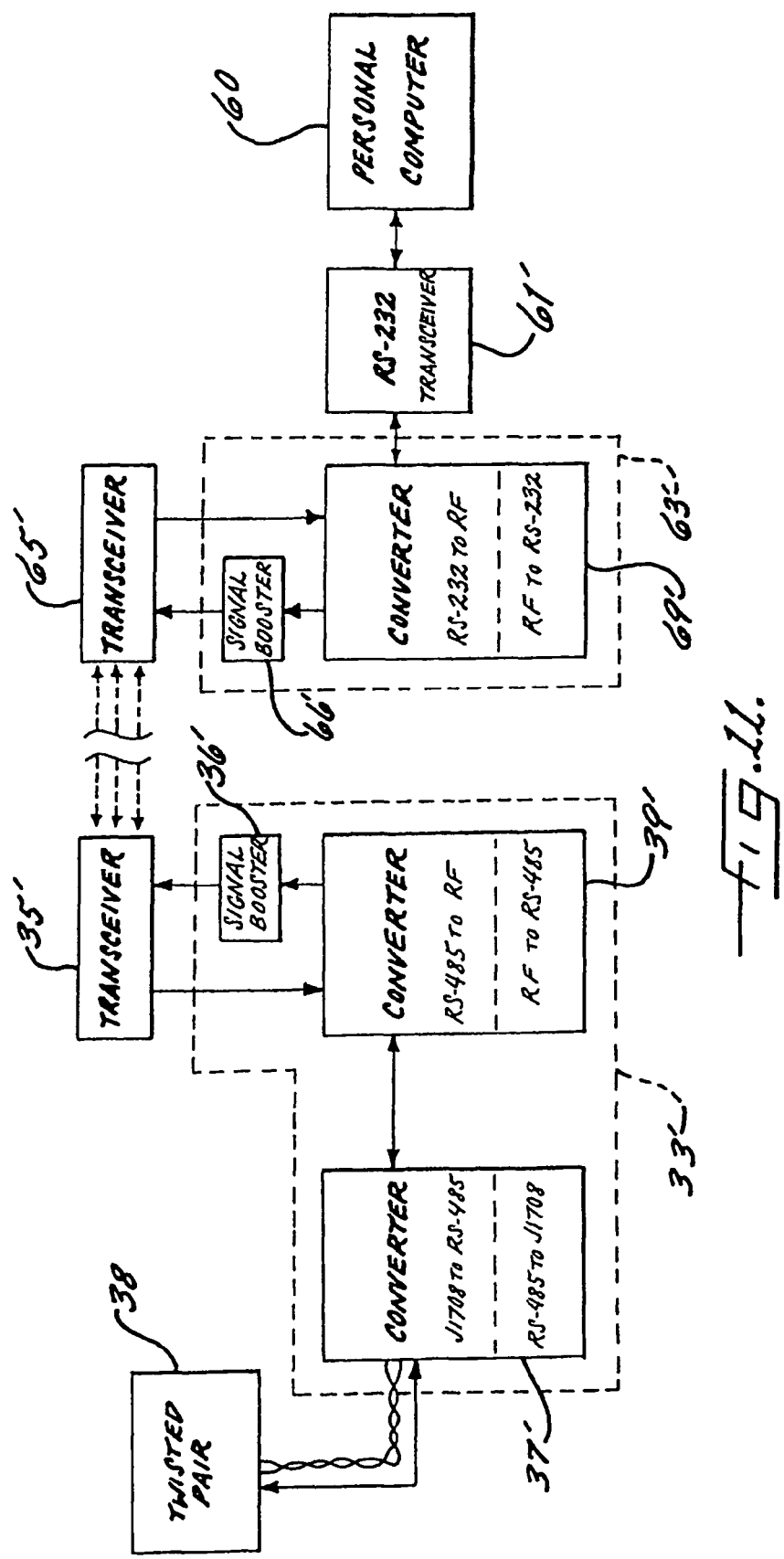

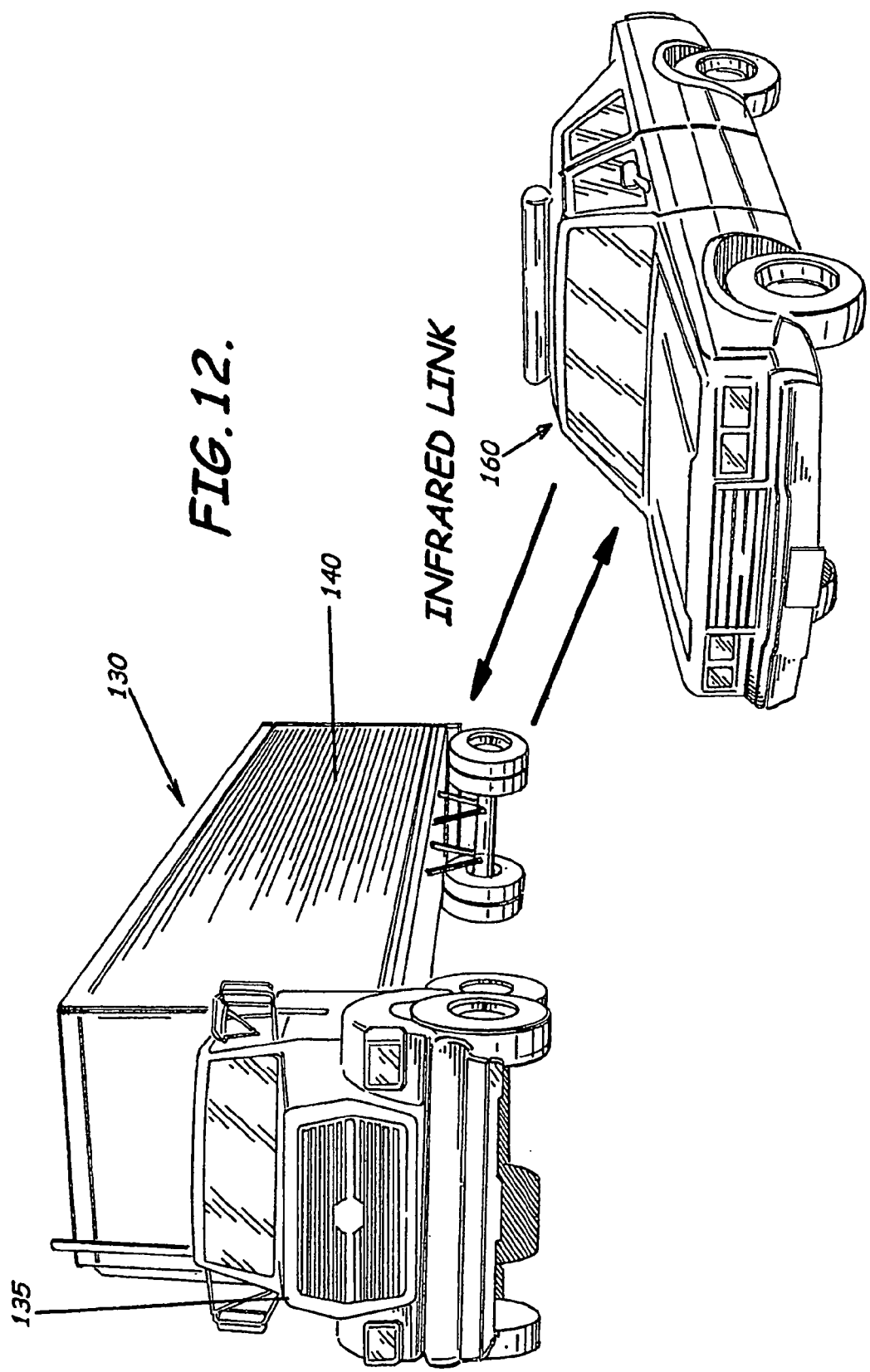

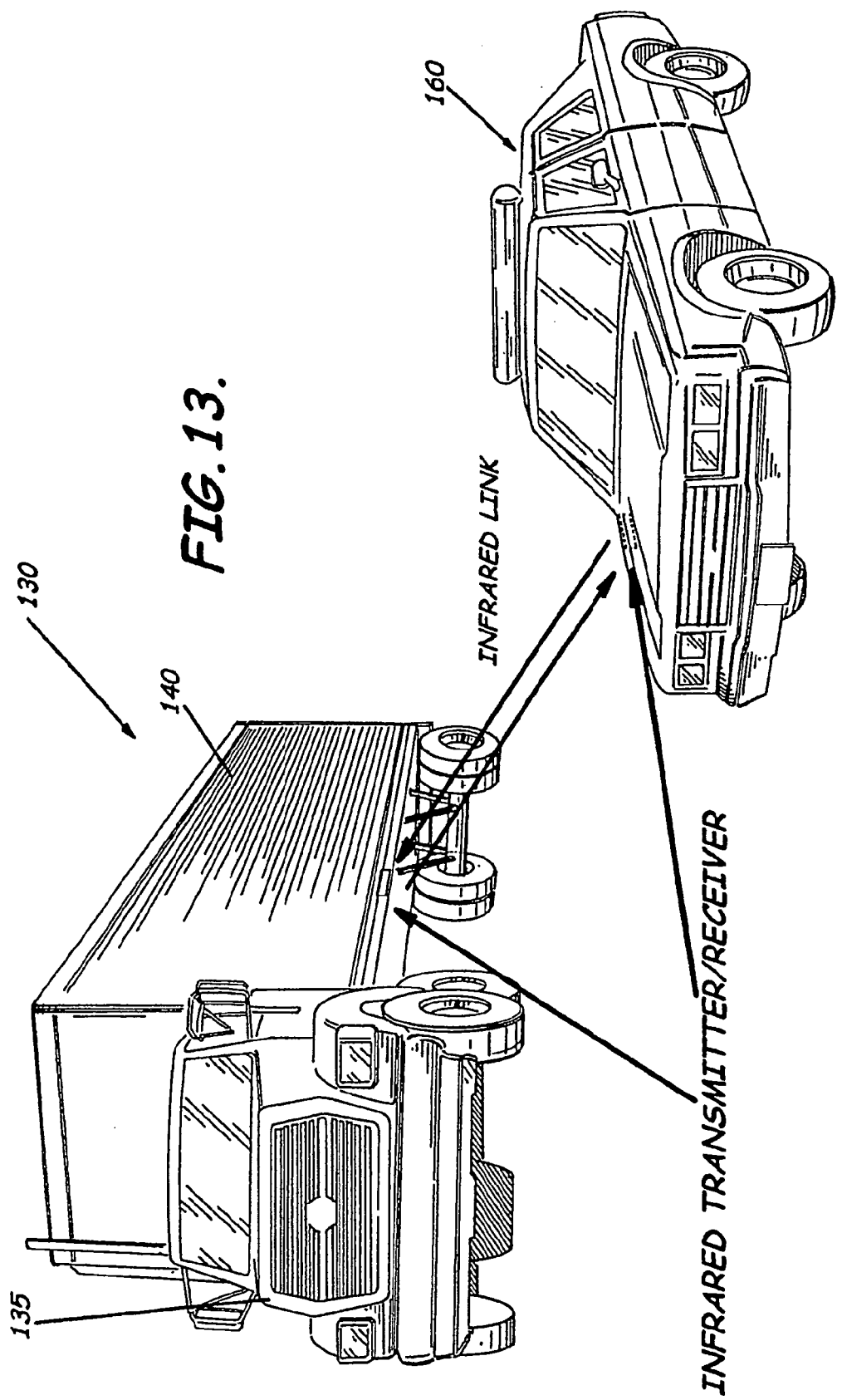

RF LINK

SYSTEM, APPARATUS AND METHODS FOR DATA COMMUNICATION BETWEEN VEHICLE AND REMOTE DATA COMMUNICATION TERMINAL, BETWEEN PORTIONS OF VEHICLE AND OTHER PORTIONS OF VEHICLE, BETWEEN TWO OR MORE VEHICLES, AND BETWEEN VEHICLE AND COMMUNICATIONS NETWORK

RELATED APPLICATIONS

This application is a continuation of U.S. patent application Ser. No. 12/291,586 filed on Nov. 12, 2008 and now issued as U.S. Pat. No. 7,817,019, which is a continuation of U.S. patent application Ser. No. 11/376,417 filed on Mar. 15, 2006 and now issued as U.S. Pat. No. 7,449,993, which is a continuation-in-part of U.S. patent application Ser. No. 10/007,032 filed on Nov. 8, 2001 and now issued as U.S. Pat. No. 6,608,554, which is a continuation of U.S. patent application Ser. No. 09/569,995 filed on May 12, 2000 and now issued as U.S. Pat. No. 6,411,203, which is a continuation of U.S. patent application Ser. No. 08/907,861 filed on Aug. 8, 1997 and now issued as U.S. Pat. No. 6,064,299, which is a continuation-in-part of U.S. patent application Ser. No. 08/554,907 filed on Nov. 9, 1995, now abandoned, and, a continuation-in-part of U.S. patent application Ser. No. 08/594,255 filed on Jan. 30, 1996 and now issued as U.S. Pat. No. 6,111,524, which is also a continuation-in-part of U.S. patent application Ser. No. 08/554,907 filed on Nov. 9, 1995 and now abandoned, and which are all incorporated herein by reference in their entireties.

BACKGROUND OF THE INVENTION

The present invention relates to the field of vehicle data communications and, more particularly, to data communications from a vehicle, such as a tractor or a trailer of a truck or an automobile, to a remote location, from a portion of a vehicle to other portions of the vehicle, from one vehicle to one or more other vehicles, or from a vehicle to a communications network.

Over the years, the vehicle industry and particularly the heavy duty vehicle industry has used tractor and trailer combinations to transport cargo over the roadways to various desired destinations. The tractors and trailer are conventionally mechanically coupled together so that the tractor efficiently and effectively pulls the trailer. Also, this mechanical coupling can often be an integral formed trailer with a tractor or cab region of a vehicle such as a pick-up truck, dump truck or other vehicle. Additionally, one or more other trailers can also be mechanically coupled to another trailer so that only one tractor or cab region pulls a plurality of trailers.

Various links between the tractor and the trailer provide vehicle subsystems, e.g., hydraulic, pneumatic, or electrical, with power and/or control signals to operate effectively. These subsystem have associated electrical conductors, pneumatic lines, or hydraulic lines extending between the tractor and trailer (s) so that these subsystems can effectively operate.

Data communications between a tractor and trailer for these subsystems also has been developed. An example of this data communications can be seen in U.S. Pat. No. 5,488,352 by Jasper titled "Communications And Control System For Tractor/Trailer And Associated Method" which is assigned to the common assignee of the present application. As described in this patent, the use of the Society of Automotive Engineering ("SAE") standard J1708 titled "Ser. Data Communications Between Microcomputer Systems In Heavy Duty Vehicle Applications" and SAE standard J1939 are also known for data communications in the heavy duty vehicle environment.

Only recently, however, has the vehicle industries, and particularly the heavy duty vehicle industries, begun to use sophisticated electrical electronic subsystems in and associated with these vehicles to perform varied task that usually involve data manipulation and transmission. Previously, computers, controllers, and computer-type electrical systems were simply not found in these vehicles, such as the tractor and trailer combinations or recreational vehicles, in a significant manner. Much of this previous slow or lack of development and advances could be attributed, for example, to the lack of governmental or other authoritative initiatives which would have otherwise required systems to be installed on these heavy duty vehicles to include sophisticated electronics and data communications.

Although only recently have advances been made with data communications in the vehicle industries, and particularly the heavy duty vehicle industry, many of the advances require extensive retrofitting or extensive additions to the vehicle. Accordingly, many vehicle owners have been hesitant to adopt and purchase sophisticated electronics and data communications because of the expense and uncertainty with the advances in the technology. Yet, having the capability to monitor and communicate with the various electronic subsystems of a vehicle such as a tractor-trailer truck, recreational vehicle, or automobile can be beneficial to the driver, the owner, governmental officials or agencies, and others having an interest in the vehicle industries.

SUMMARY OF THE INVENTION

With the foregoing in mind, the present invention advantageously provides a system, an apparatus and methods of data communication between a vehicle and a 35 remote data communication terminal so that various operating characteristics of the vehicle can be monitored or observed. The remote data communications terminal, for example, can be in a portable computer, a base station, another vehicle, a building, or a building structure. The present invention also advantageously provides a system, an apparatus and methods of data communication for discretely and compactly communicating data between a vehicle and a remote data communication terminal, between portions of a vehicle, between vehicles, and between a vehicle and a communication network. The present invention additionally provides a system, an apparatus and methods of data communication which is readily adapted to existing vehicle data communication technology and does not require either extensive retrofitting or extensive and expensive additions to existing vehicle data communication technology. The present invention further advantageously provides a system, an apparatus and methods of data communication so that when the apparatus is mounted to a vehicle a third party would not readily recognize that the vehicle is equipped for data communications from the vehicle to a remote data communications terminal to thereby reduce risk of theft, damage, or interference with the vehicle communication. More particularly, a combination of a vehicle and a data communication apparatus are provided according to the present invention. Although the vehicle is preferably a tractor and a trailer connected to the tractor, as understood by those skilled in the art other various types of vehicles, including various types of heavy duty vehicles, can be used as well according to the present invention. The tractor preferably includes a cab. The cab can also be within an automobile, truck, train, airplane, or boat as well. The data communications apparatus is preferably connected to the tractor and the trailer for communicating data to and from the tractor and the trailer to a remote data terminal. The data communications apparatus preferably includes a plurality of electrical conductors associated with and extending between the tractor and the trailer.

A connector preferably is connected to, e.g., in series with, the plurality of electrical conductors and positioned in the cab of the tractor or other vehicle. It will be understood by those skilled in the art, however, that various other positions associated with the tractor or other portions of a vehicle can be used as well according to the present invention, e.g., along the outer peripheral walls of a vehicle, mounted to a window of a vehicle, mounted to or within a trailer, or mounted to an engine or an engine compartment of a vehicle. The apparatus also includes vehicle data communications protocol converter connected to the plurality of electrical conductors to convert a first data communications protocol used to communicate data along the plurality of electrical conductors to a second data communications protocol. For example, the second data communications protocol is preferably one of either an infrared data communications protocol, a radio frequency ("RF") data communications protocol, including Bluetooth and Institute for Electronic and Electrical Engineers ("IEEE") 802.11 standards, an Internet or other global communications network data protocol, a local area network data communications protocol, other wireless data communications protocol, or a power line carrier ("PLC") communications protocol, including Spread Spectrum PLC protocol. A first transceiver preferably is associated with the connector and is connected to the vehicle data communications protocol converter to transmit and receive the second data communications protocol. A remote data communication terminal which preferably includes a second transceiver to transmit the second data communications protocol to the first transceiver and receive the data communications protocol from the first transceiver.

Also, according to another aspect of the present invention, the data communication apparatus preferably includes a plurality of electrical conductors associated with a vehicle. A vehicle data communications protocol converter is preferably connected to the plurality of electrical conductors to convert a first data communications protocol associated with data communications along the plurality of electrical conductors to a second data communications protocol. The apparatus also preferably includes a transceiver connected to the vehicle data communications protocol converter to transmit the data communications protocol from the vehicle and receive the data communications protocol from a remote data communications terminal.

According to yet another aspect of the present invention, an apparatus for data communications associated with a vehicle preferably includes a transceiver housing adapted to be connected to at least one of a plurality of electrical conductors associated with the vehicle. A vehicle data communications protocol converter is preferably positioned in the transceiver housing to convert a first data communications protocol associated with data communications along the plurality of electrical conductors to a second data communications protocol. The apparatus also has a transceiver positioned within the transceiver housing and connected to the vehicle data communications protocol converter to transmit the second data communications protocol from the vehicle and receive the data communications protocol from a remote data communications terminal.

Still according to another aspect of the present invention, an apparatus for data communications associated with a vehicle preferably includes a transceiver housing mounted to a vehicle. The transceiver housing is preferably a vehicle light housing such as a side light marker housing. A vehicle data communications protocol converter is preferably positioned in the transceiver housing to convert a first data communications protocol associated with data communications along the plurality of electrical conductors to a second data communications protocol. A transceiver is preferably positioned within the transceiver housing and is connected to the vehicle data communications protocol converter to transmit the second data communications protocol from the vehicle and receive, the data communications protocol from a remote data communications terminal.

A method of data communications associated with a vehicle is also provided according to the present invention. The method preferably includes providing a plurality of electrical conductors associated with a vehicle and converting a first data communications protocol associated with data communications along the plurality of conductors to a second data communications protocol. The second data communications protocol is preferably one of either an infrared data communications protocol, a radio frequency ("RE") data communications protocol, including Bluetooth and IEEE 802.11 Standards, an Internet or other global communications network protocol, a local area network data communications protocol, other wireless data communications protocols, or a power line carrier communications protocol, including Spread Spectrum PLC protocol. The method also includes transmitting the data communications protocol from the vehicle to a remote data communications terminal, to other portions of the vehicle, to one or more other vehicles, or to a communications network.

BRIEF DESCRIPTION OF THE DRAWINGS

Some of the objects and advantages of the present invention having been stated, others will become apparent as the description proceeds when taken in conjunction with the accompanying drawings in which:

FIG. 3 is a perspective view of an apparatus for data communications between a vehicle and a remote data communications terminal having a transceiver positioned in a cab of a tractor of a tractor/trailer truck and a remote data communications terminal positioned in the hands of a driver according to a first embodiment of the present invention;

FIG. 4 is an exploded perspective view of a connector, a transceiver housing, and a transceiver of an apparatus for data communications between a vehicle and a remote data communications terminal according to a first embodiment of the present invention;

FIG. 5 is a schematic block diagram of an apparatus for data communications between a vehicle and a remote data communications terminal according to the present invention;

FIG. 6 is a fragmentary side elevational view of an apparatus for data communications between a vehicle and a remote data communications terminal according to a second embodiment of the present invention;

FIG. 7 is an enlarged perspective view of a vehicle light housing in the form of a vehicle side light marker housing having portions thereof broken away for clarity and having a transceiver positioned therein of an apparatus for data communications between a vehicle and a remote data communications terminal according to a second embodiment of the present invention;

FIG. 8 is an enlarged perspective view of a connector, a transceiver housing, and a transceiver positioned in the transceiver housing of an apparatus for data communications between a vehicle and a remote data communications terminal according to a third embodiment of the present invention;

FIG. 9 is a sectional view of a transceiver housing of an apparatus for data communications between a vehicle and a remote data communications terminal taken along line 9-9 of FIG. 8 according to a third embodiment of the present invention;

FIG. 10 is a side elevational view of an apparatus for data communications between a vehicle and a remote data communications terminal according to a third embodiment of the present invention;

FIG. 11 is schematic block diagram of an apparatus for data communications between a vehicle and a remote data communications terminal according to the present invention;

FIG. 12 is a perspective environmental view of a system for data communication between vehicles using an infrared communication link from a cab of tractor through a window to a cab of a security automobile according to a fourth embodiment of the present invention the present invention;

FIG. 13 is a perspective environmental view of an apparatus for data communication between a trailer of a heavy duty vehicle and a security automobile using an infrared communication link mounted to a side panel of the trailer and a side panel of the security vehicle according to a fifth embodiment of the present invention;

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein.

Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

FIGS. 1-36 illustrate various embodiments of system, apparatus and methods for data communication between a vehicle 20 and a remote data communication terminal, between portions of vehicle and other portions of vehicle, between two or more vehicles, and between a vehicle and a communications network according to the present invention.

Figure 1:
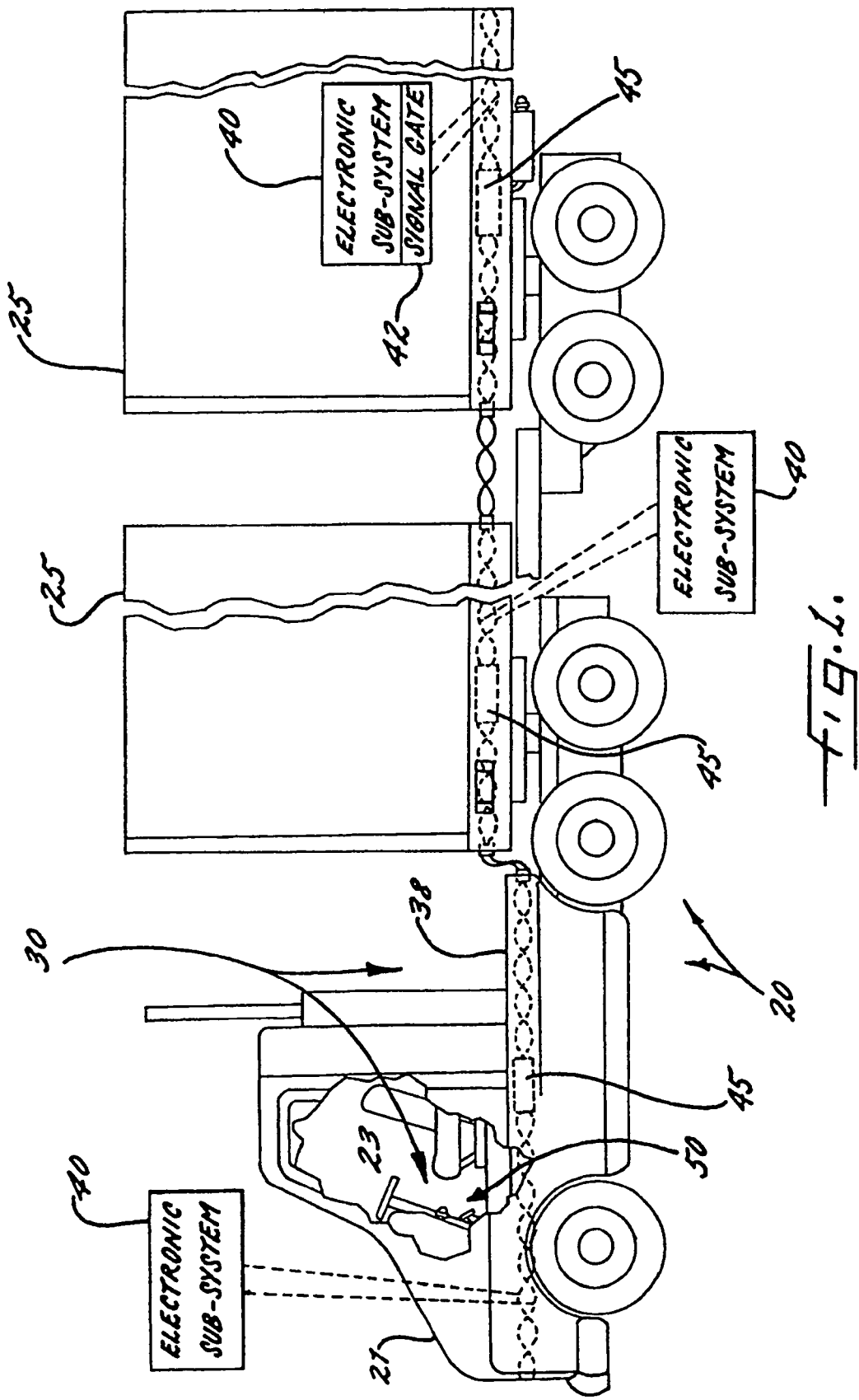
FIG. 1 is a side elevational view of a vehicle in an embodiment as a tractor/trailer truck in combination with an apparatus for data communications between the 10 truck and a remote data communication terminal according to the present invention.
Figure 2:
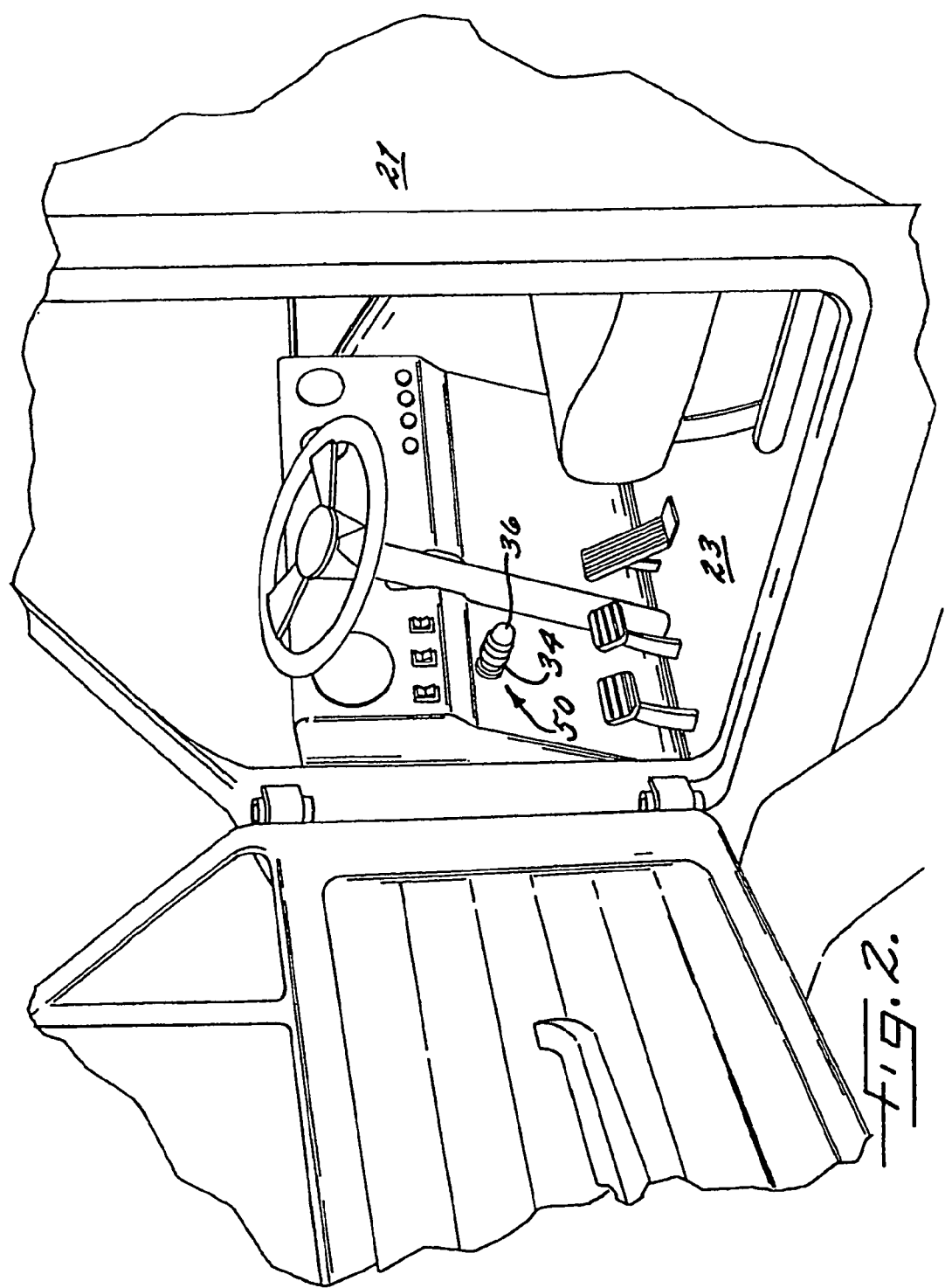
FIG. 2 is a perspective view of an apparatus for data communications between a vehicle and a remote data communications terminal having a transceiver positioned 15 in a cab of a tractor of a tractor/trailer truck according to a first embodiment of the present invention.
Figure 14:
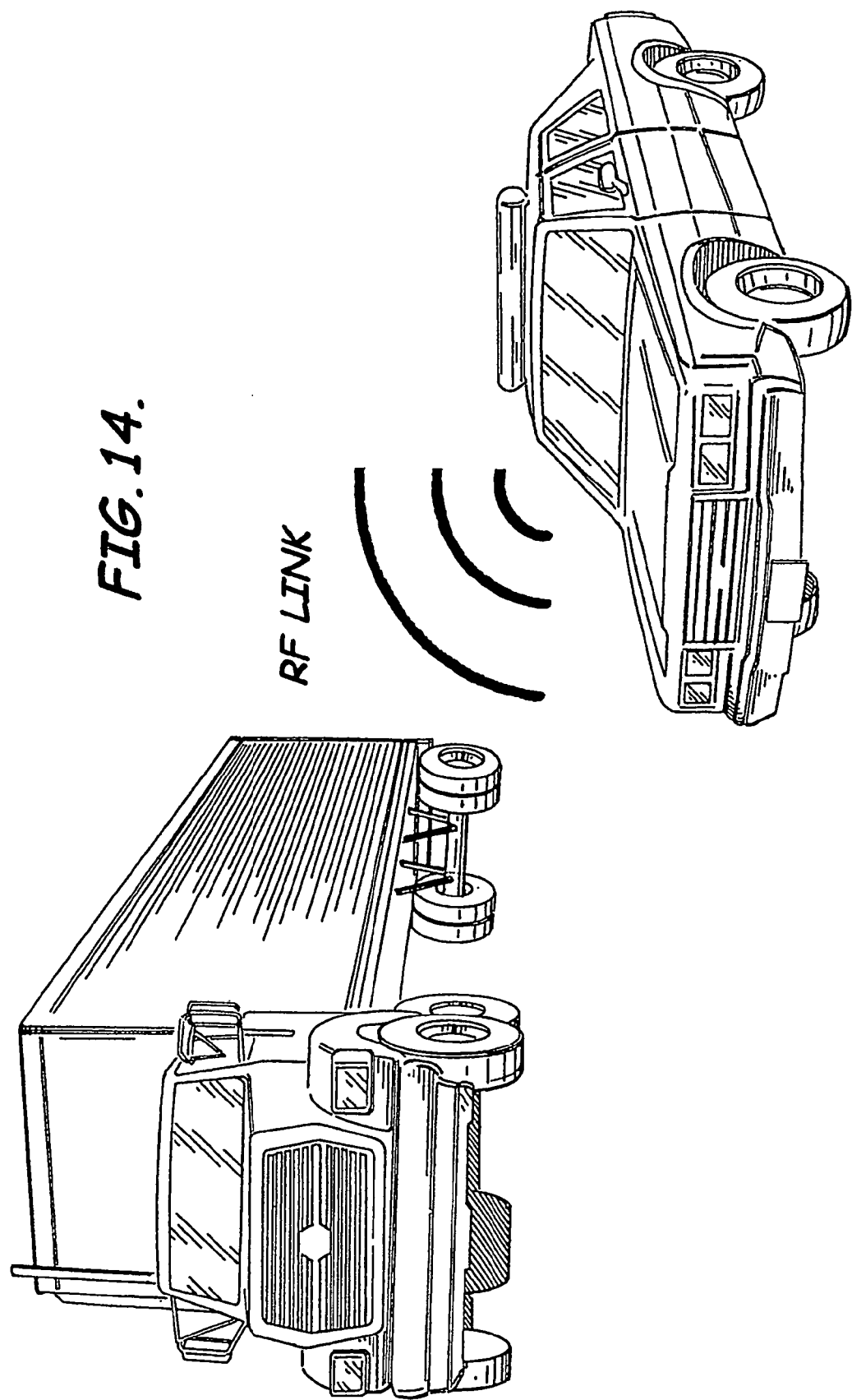
FIG. 14 is a perspective environmental view of a system for data communication between vehicles using a radio frequency link from a cab of a tractor to a cab of a security automobile according to a sixth embodiment of the present invention.
Figure 15:
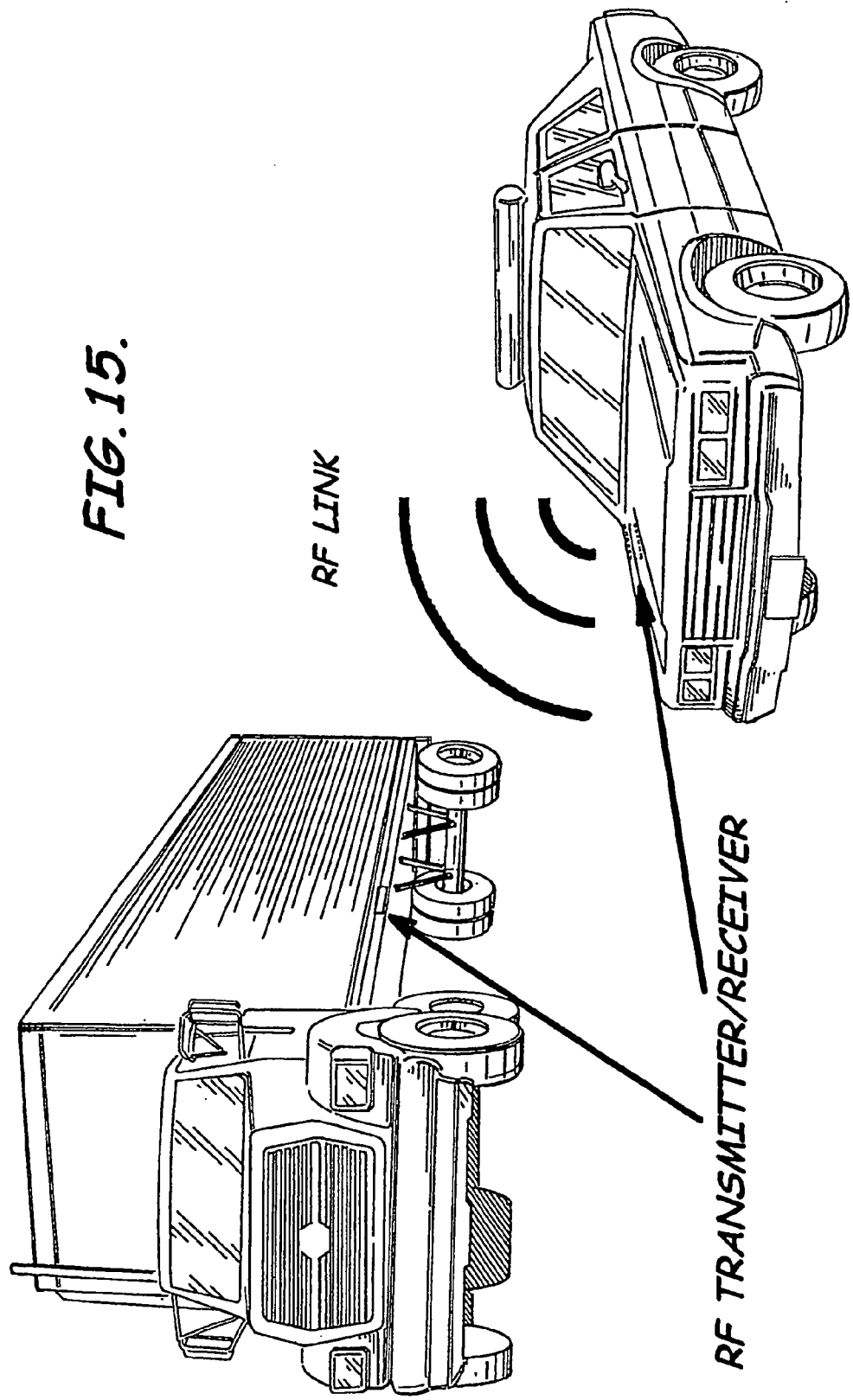
FIG. 15 is a perspective environmental view of an apparatus for data communication between vehicles using a radio frequency link mounted to a side panel of a trailer and a side panel of a security vehicle according to a seventh embodiment of the present invention.
Figure 16:
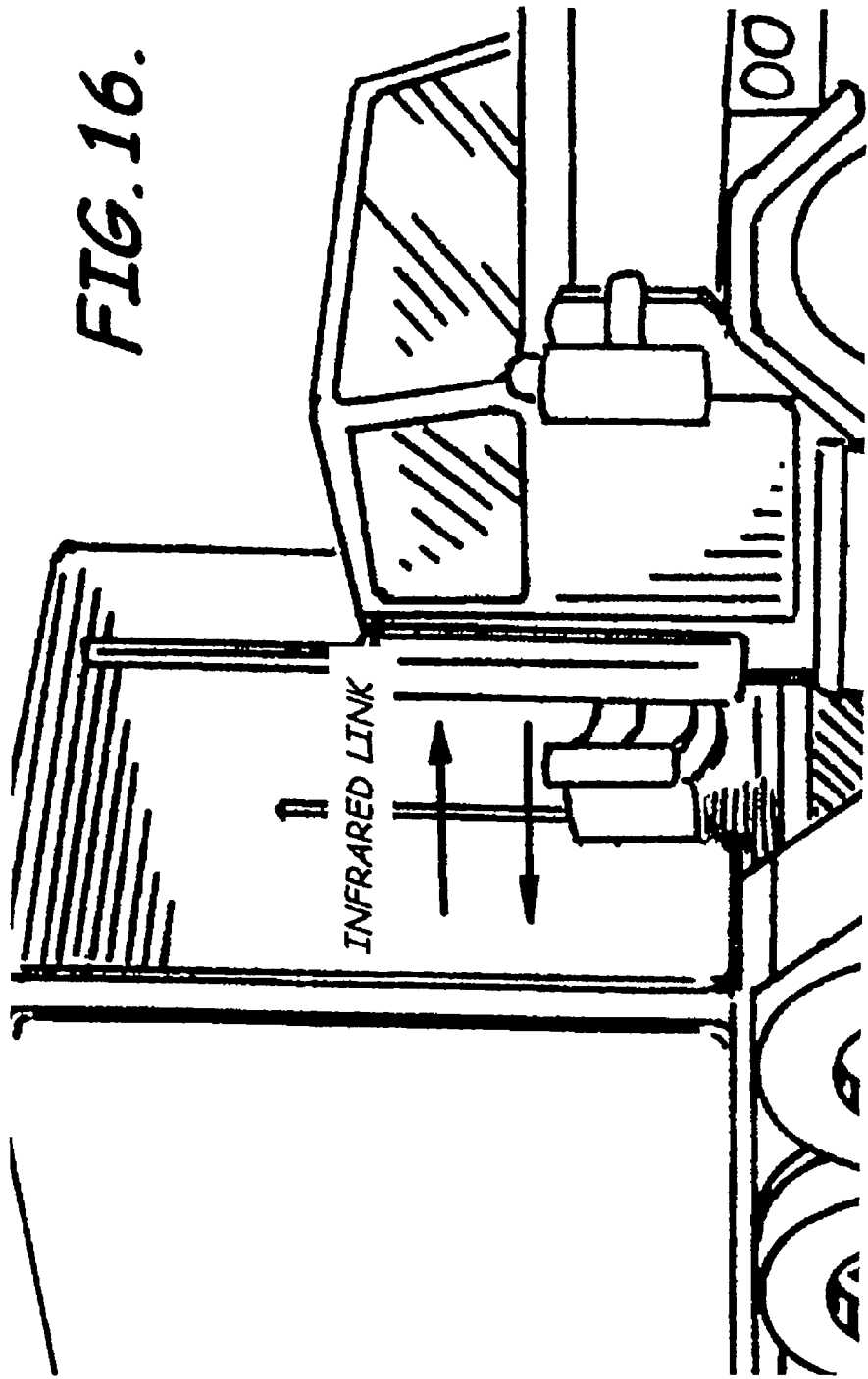
FIG. 16 is a perspective view of a system for data communication between a tractor and a trailer of a heavy duty vehicle using an infrared link according to an eighth embodiment of the present invention.
Figure 17:
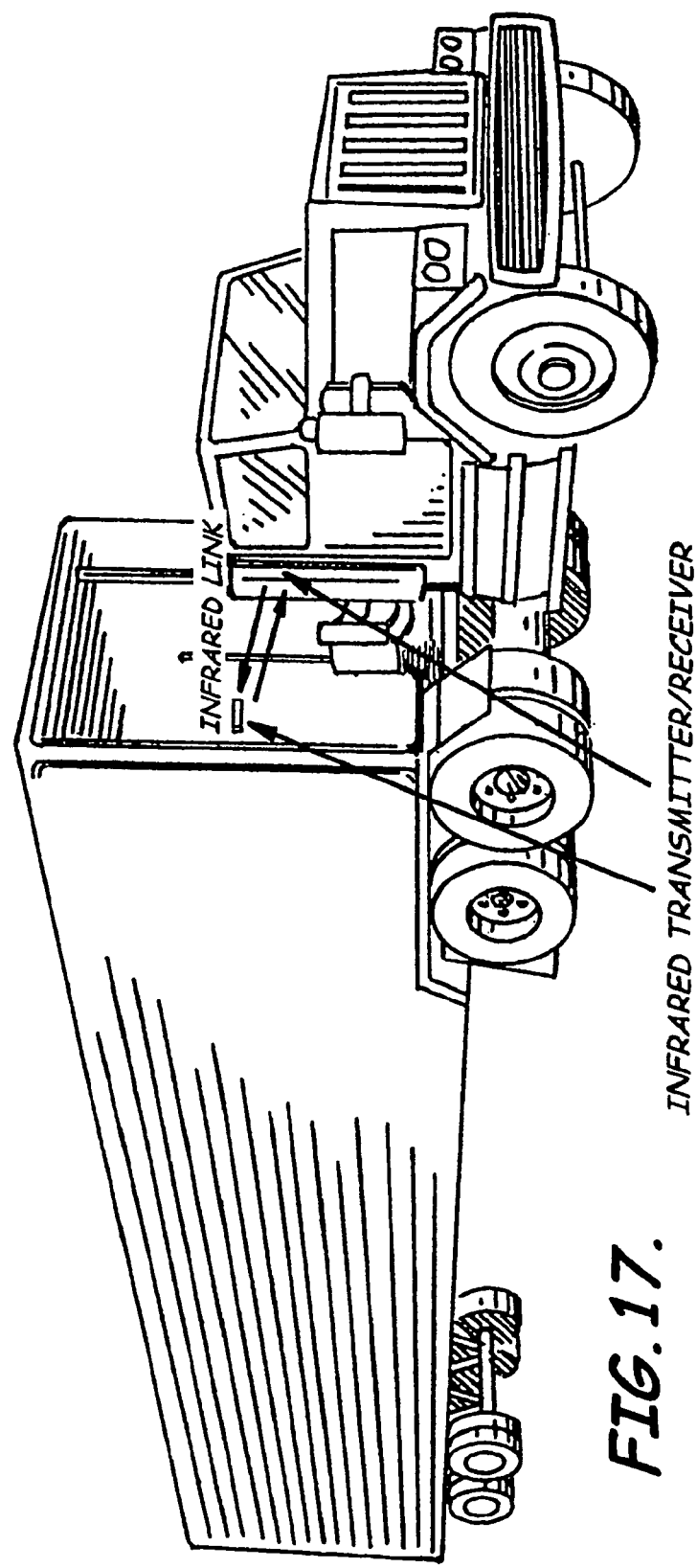
FIG. 17 is a perspective view of a system for data communication between a tractor and a trailer of a heavy duty vehicle using an infrared link according to the eighth embodiment of the present invention.
Figure 18:
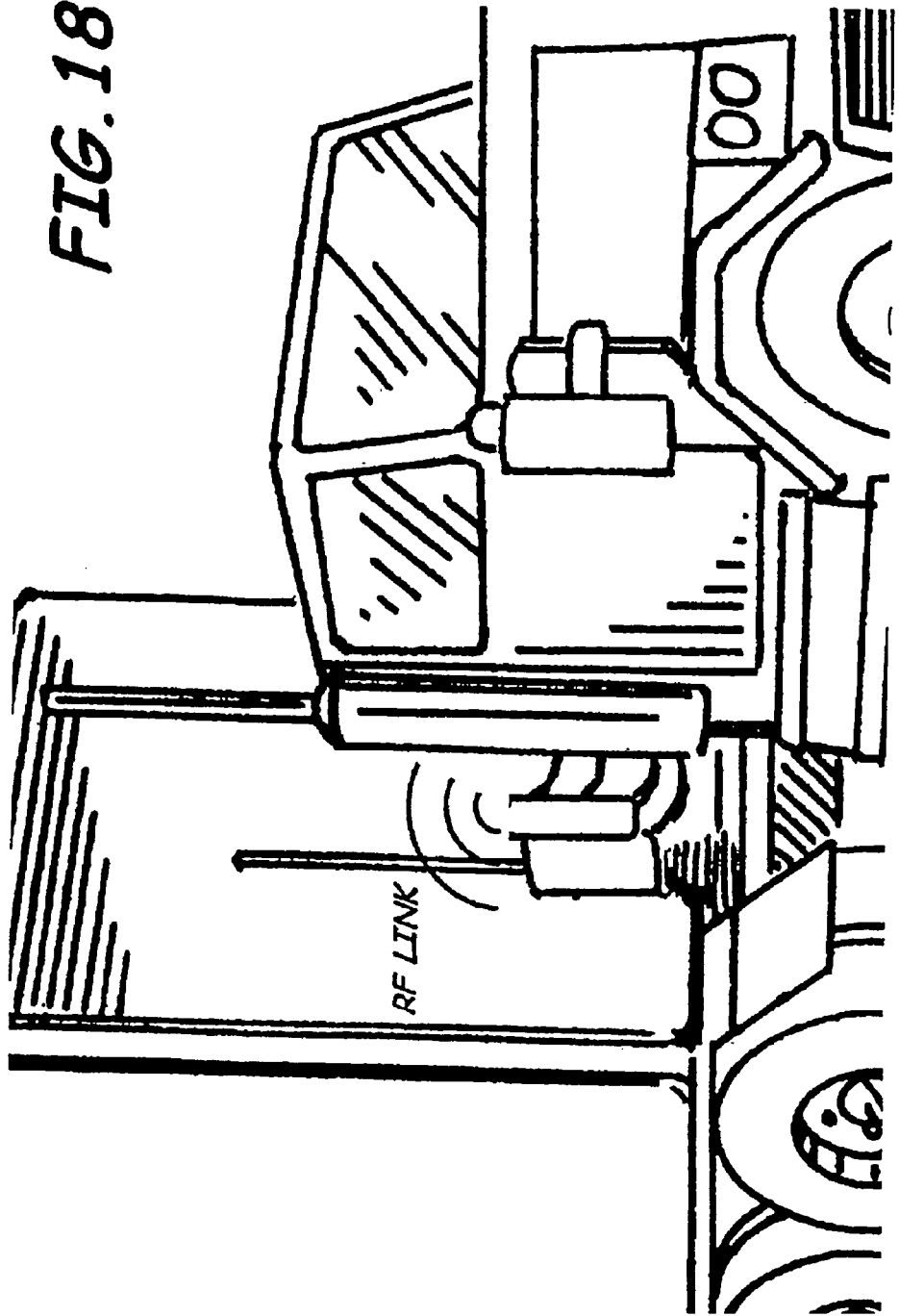
FIG. 18 is a perspective view of a system for data communication between a tractor and a trailer of a heavy duty vehicle using a radio frequency link according to an eighth embodiment of the present invention.
Figure 19:
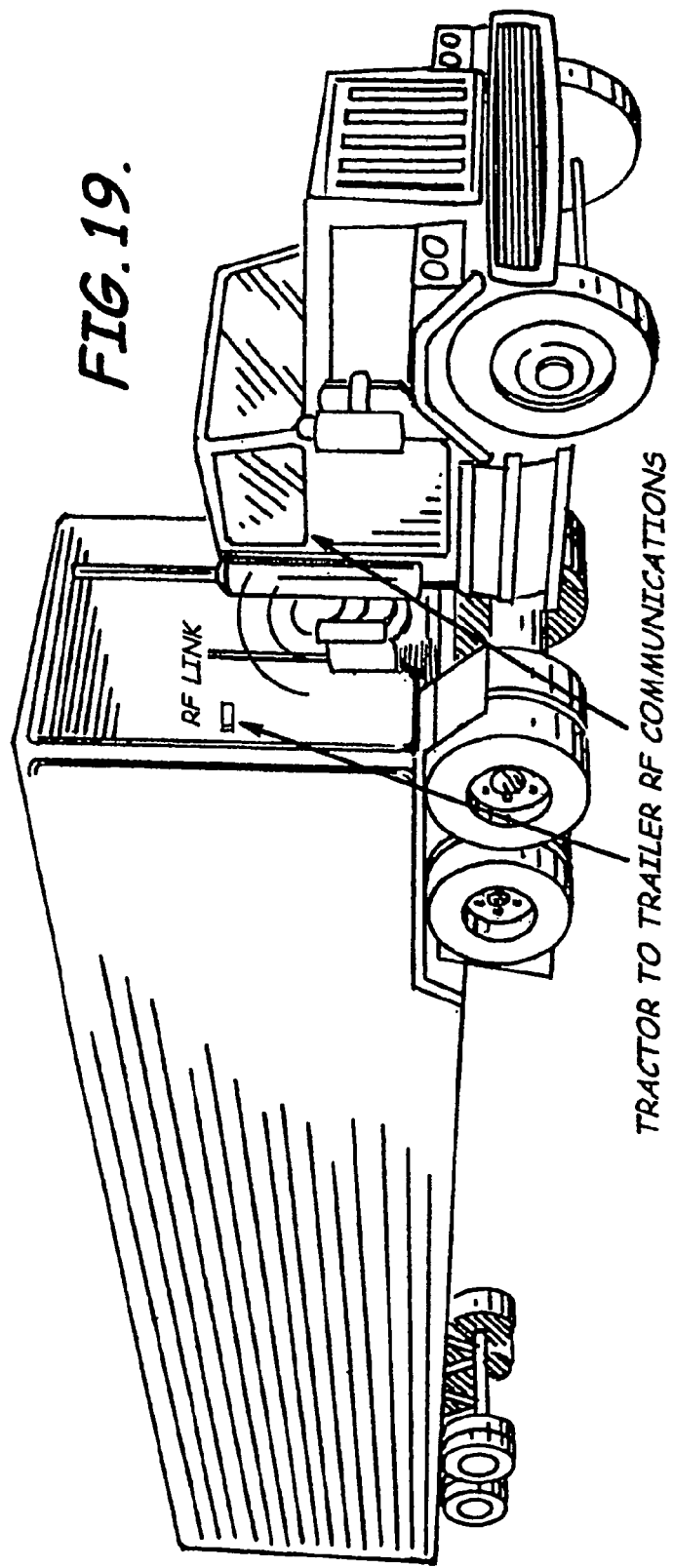
FIG. 19 is a perspective view of a system for data communication between a tractor and a trailer of a heavy duty vehicle using a radio frequency link according to the eighth embodiment of the present invention.
Figure 20:
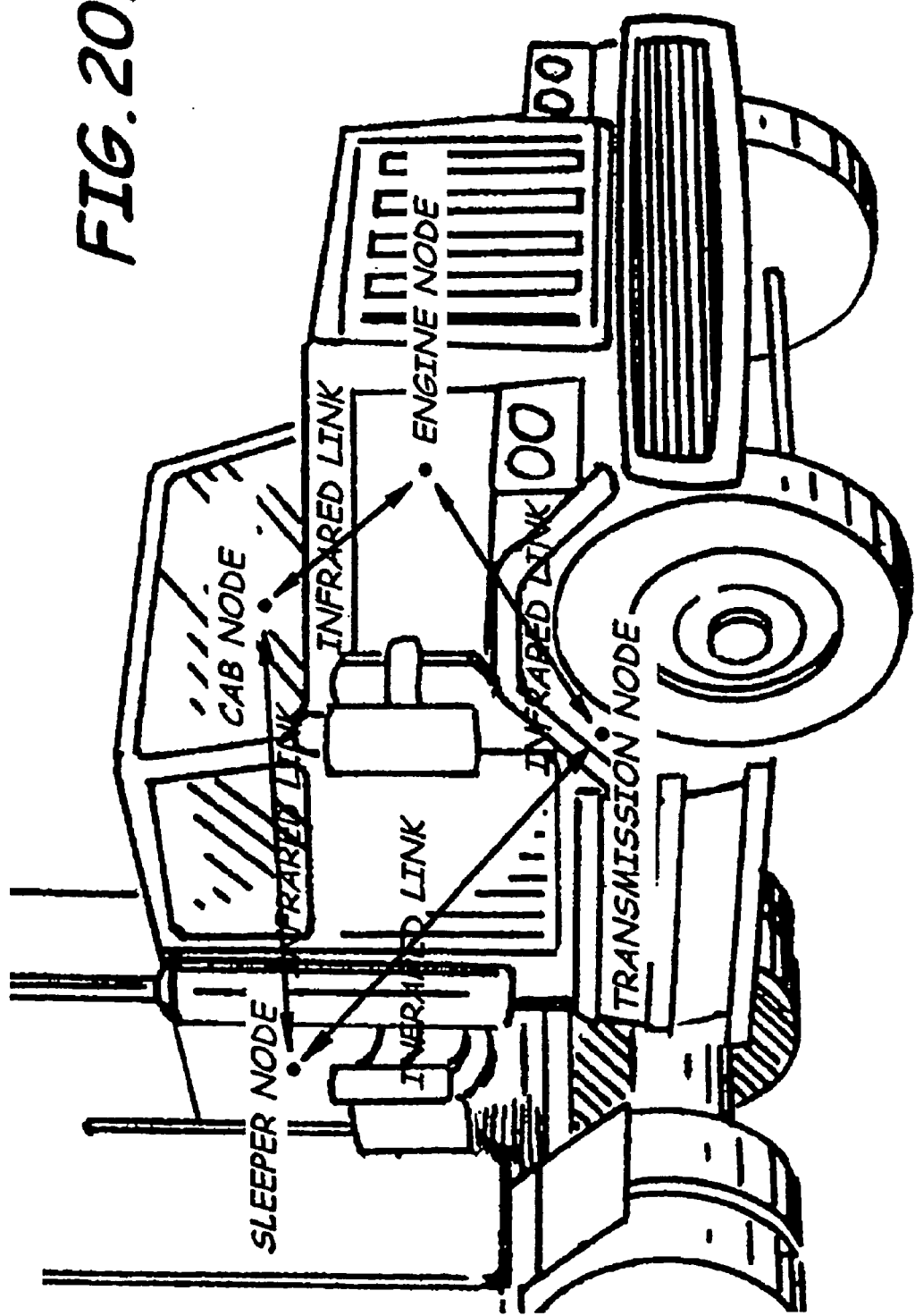
FIG. 20 is a perspective environmental view of a system for data communication between portions of a vehicle using an infrared link according to a ninth embodiment of the present invention.
Figure 21:
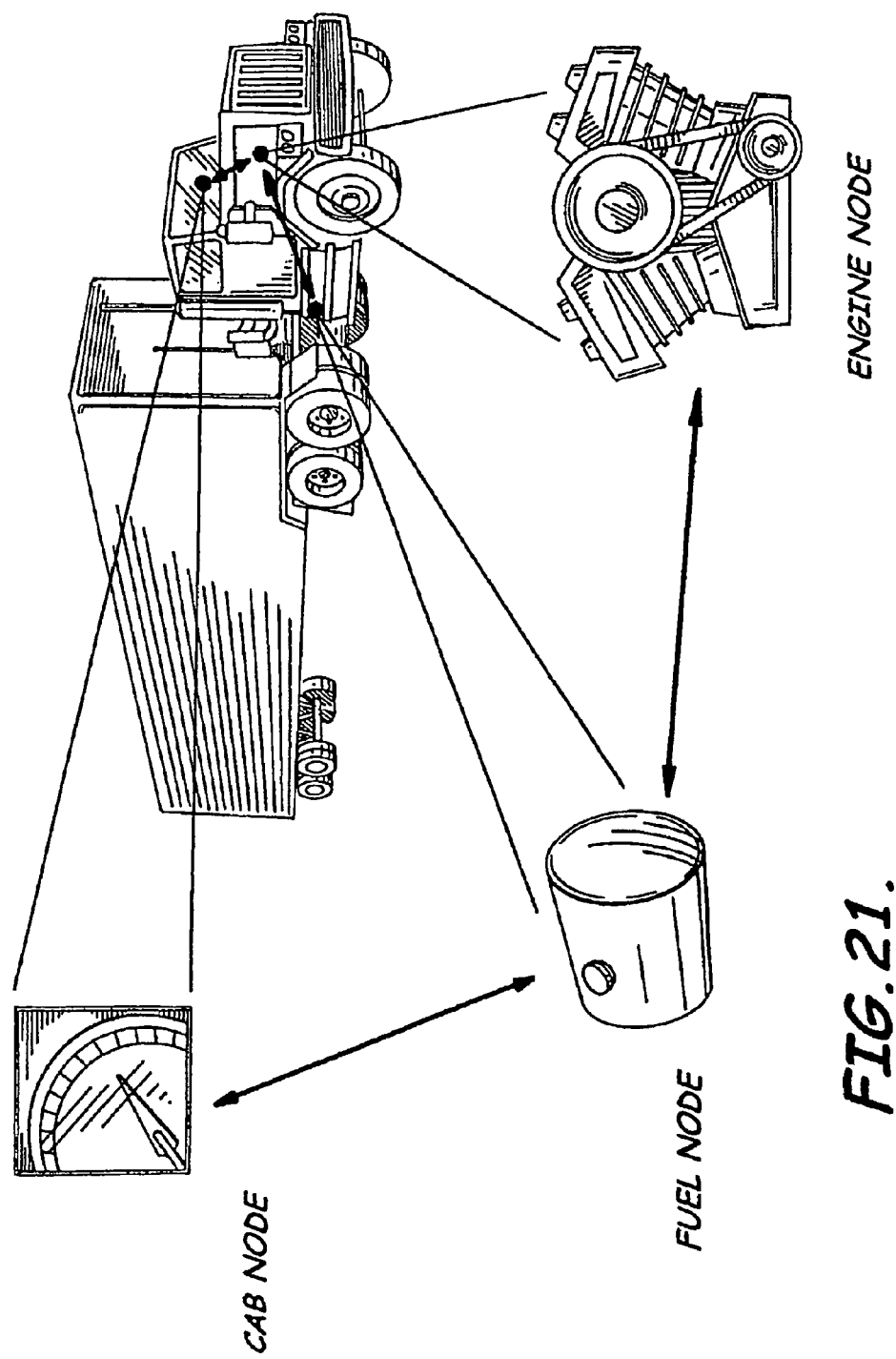
FIG. 21 is an exploded perspective view of a system for data communication between a portion of a tractor and to a portion of a trailer of a heavy duty vehicle using an infrared link according to a tenth embodiment of the present invention.
Figure 22:
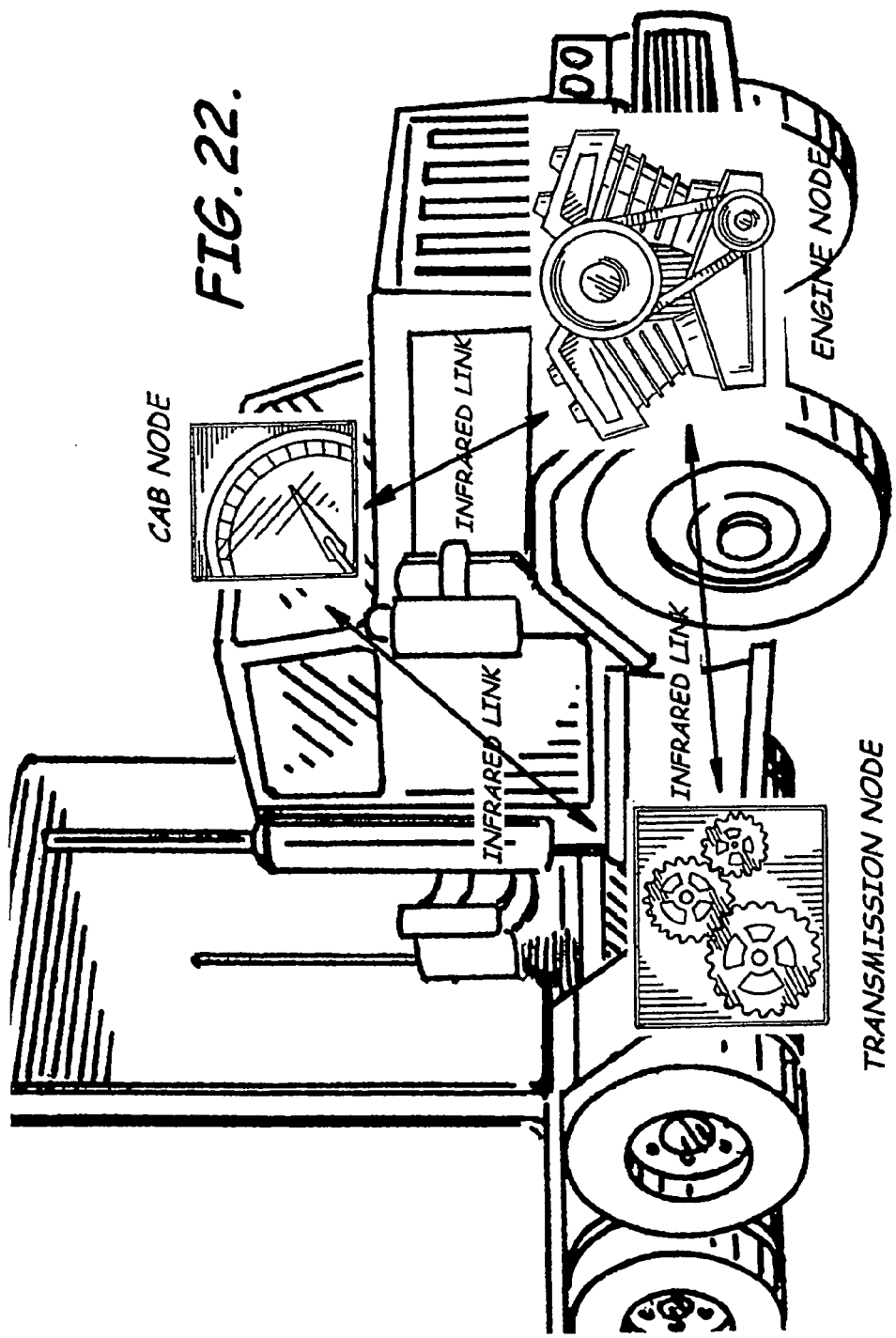
FIG. 22 is a perspective environmental view of a system for data communication between portions of a vehicle using an infrared link according to an eleventh embodiment of the present invention.
Figure 23:
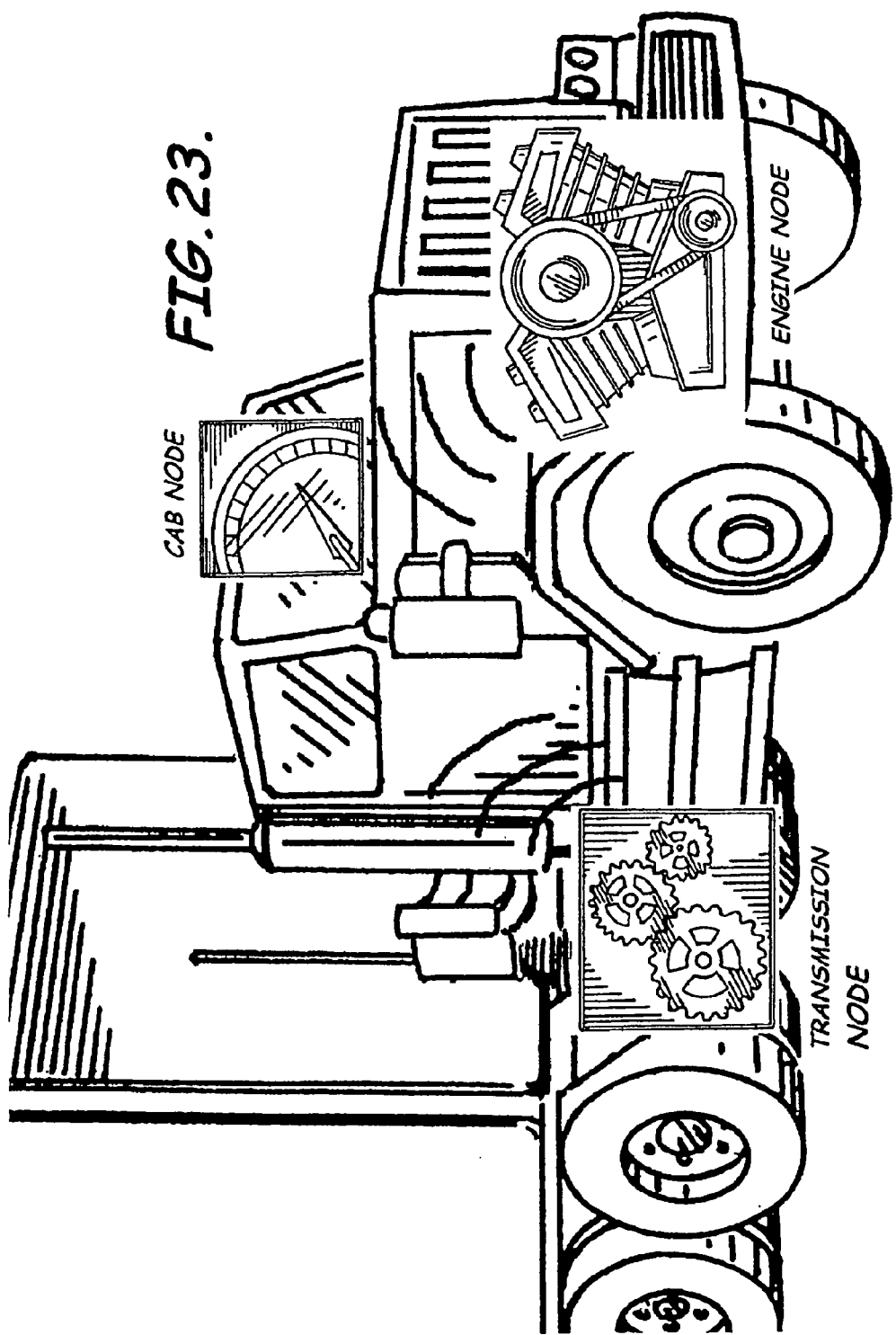
FIG. 23 is a perspective environmental view of a system for data communication between portions of a vehicle using a radio frequency link according to a twelfth embodiment of the present invention.
Figure 24:
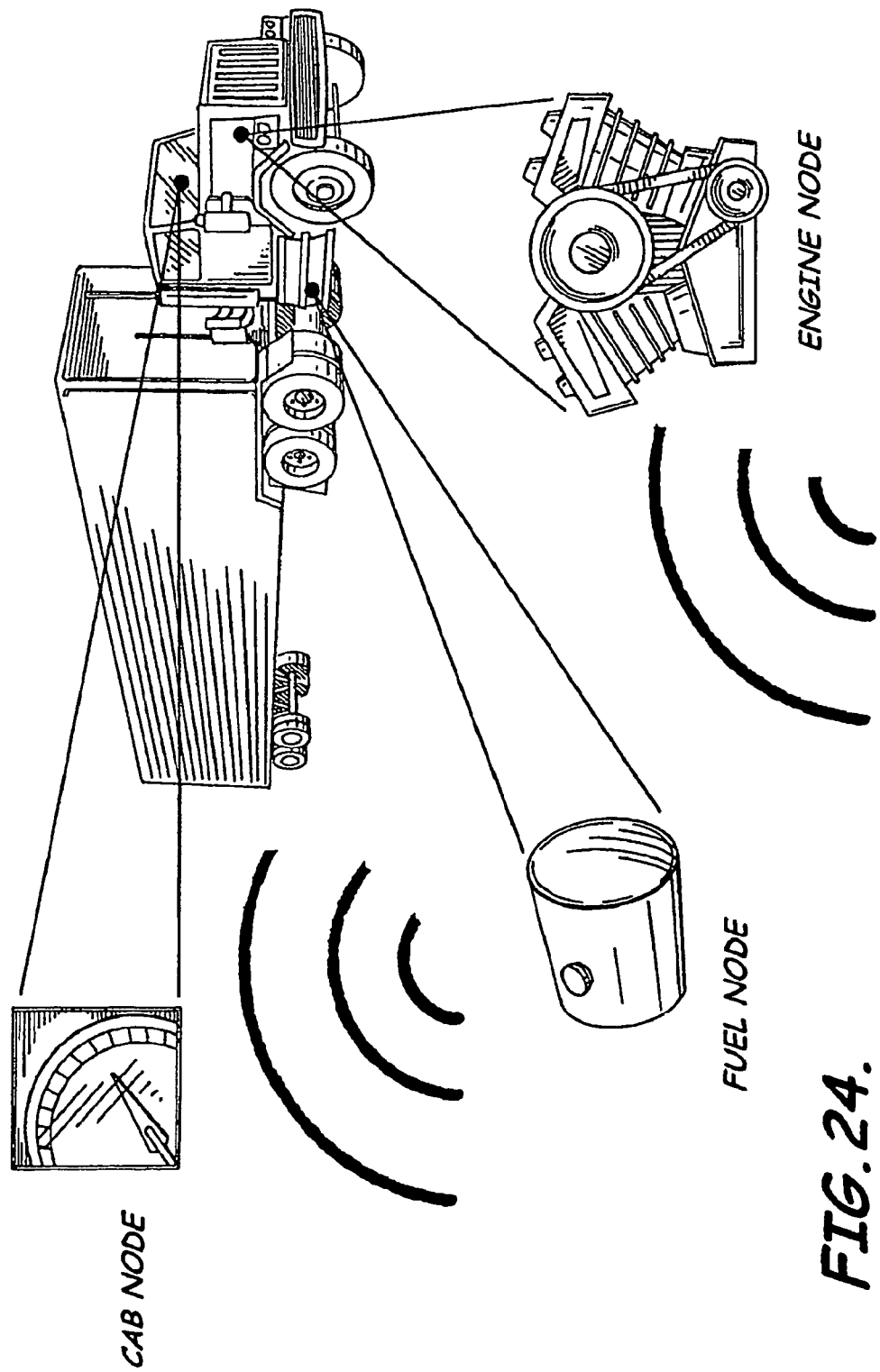
FIG. 24 is an exploded perspective view of a system for data communication between a portion of a tractor and to a portion of a trailer of a heavy duty vehicle using a radio frequency link according to a thirteenth embodiment of the present invention.
Figure 25:
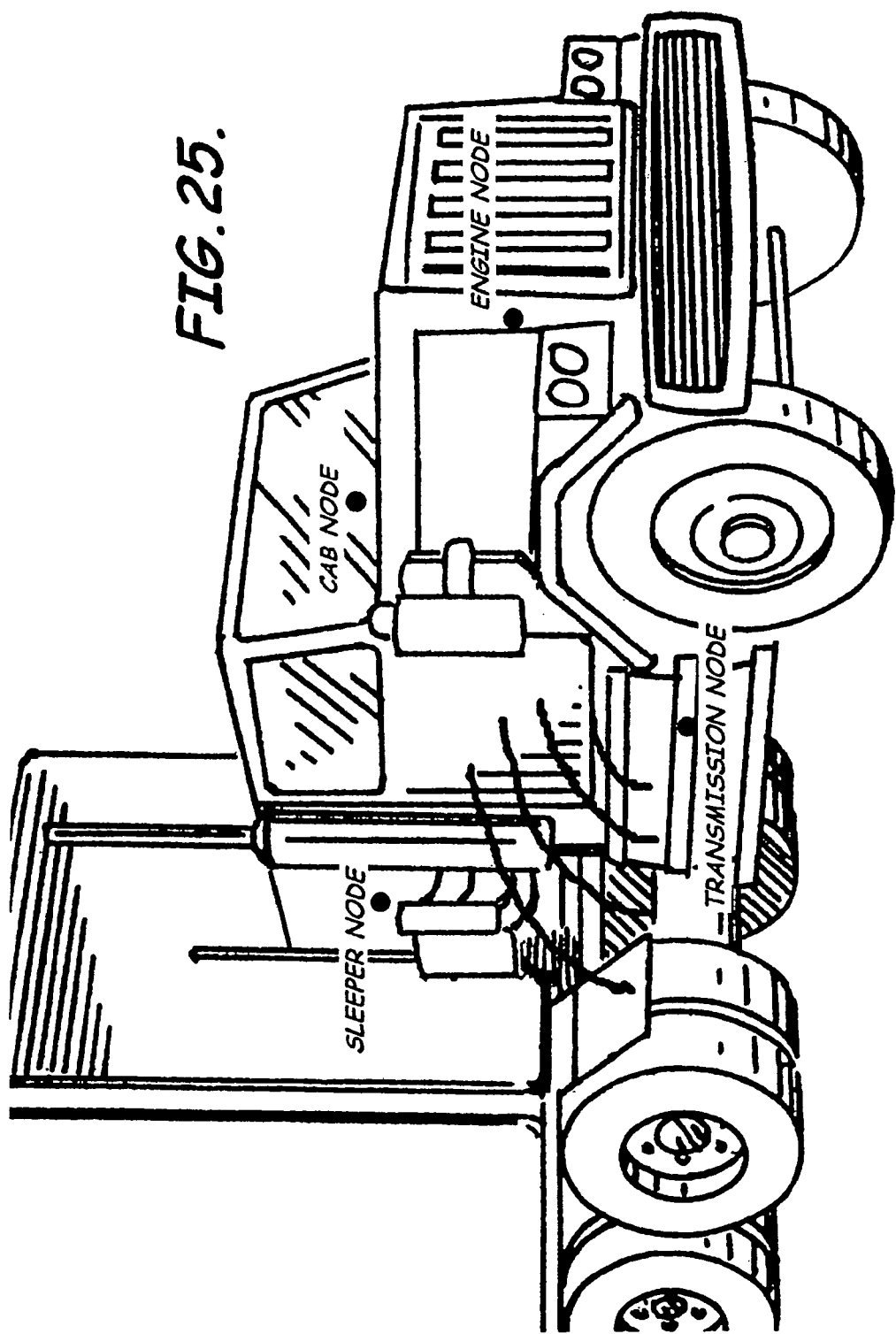
FIG. 25 is a perspective environmental view of a system for data communication between portions of a vehicle using a radio frequency link according to an fourteenth embodiment of the present invention.
Figure 26:
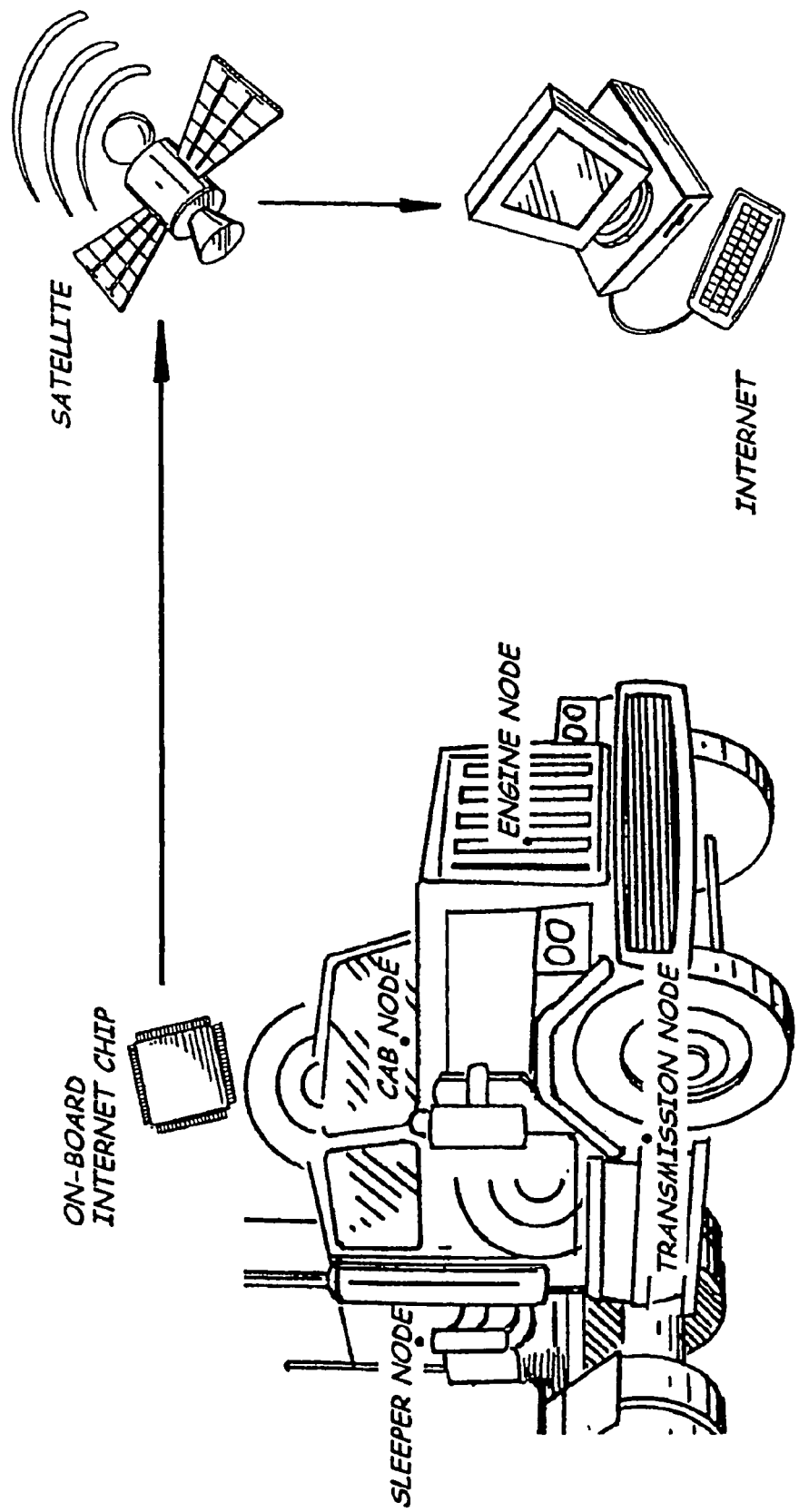
FIG. 26 is a schematic view of a system for data communications between portions of a vehicle and a communications network using a radio frequency link and to a remote data terminal through the communications network according to a fifteenth embodiment of the present invention.
Figure 27:
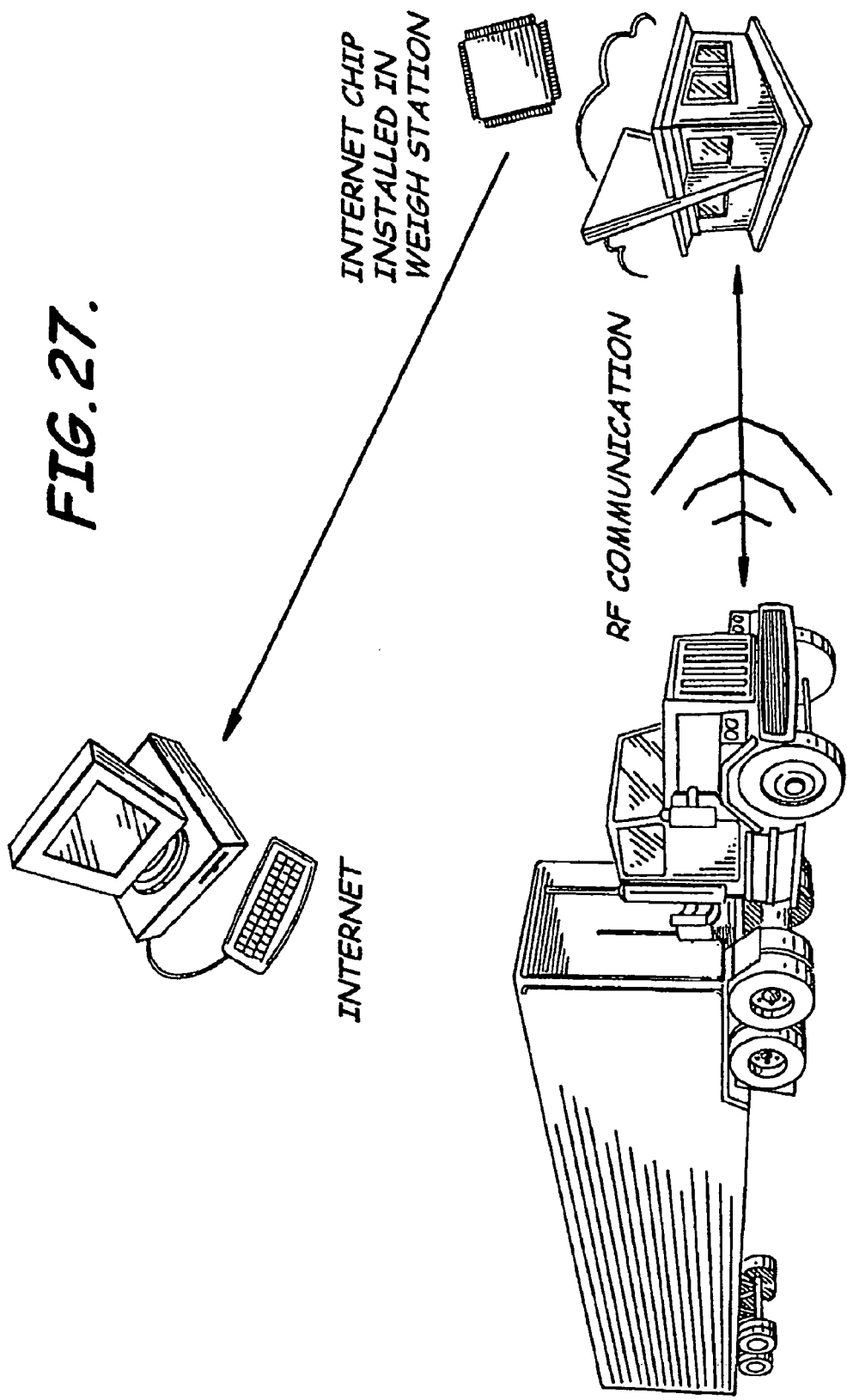
FIG. 27 is a schematic view of a system for data communications between a vehicle and a remote data terminal or communications network using a radio frequency link and then to remote data terminal through the communications network according to a sixteenth embodiment of the present invention.
Figure 28:
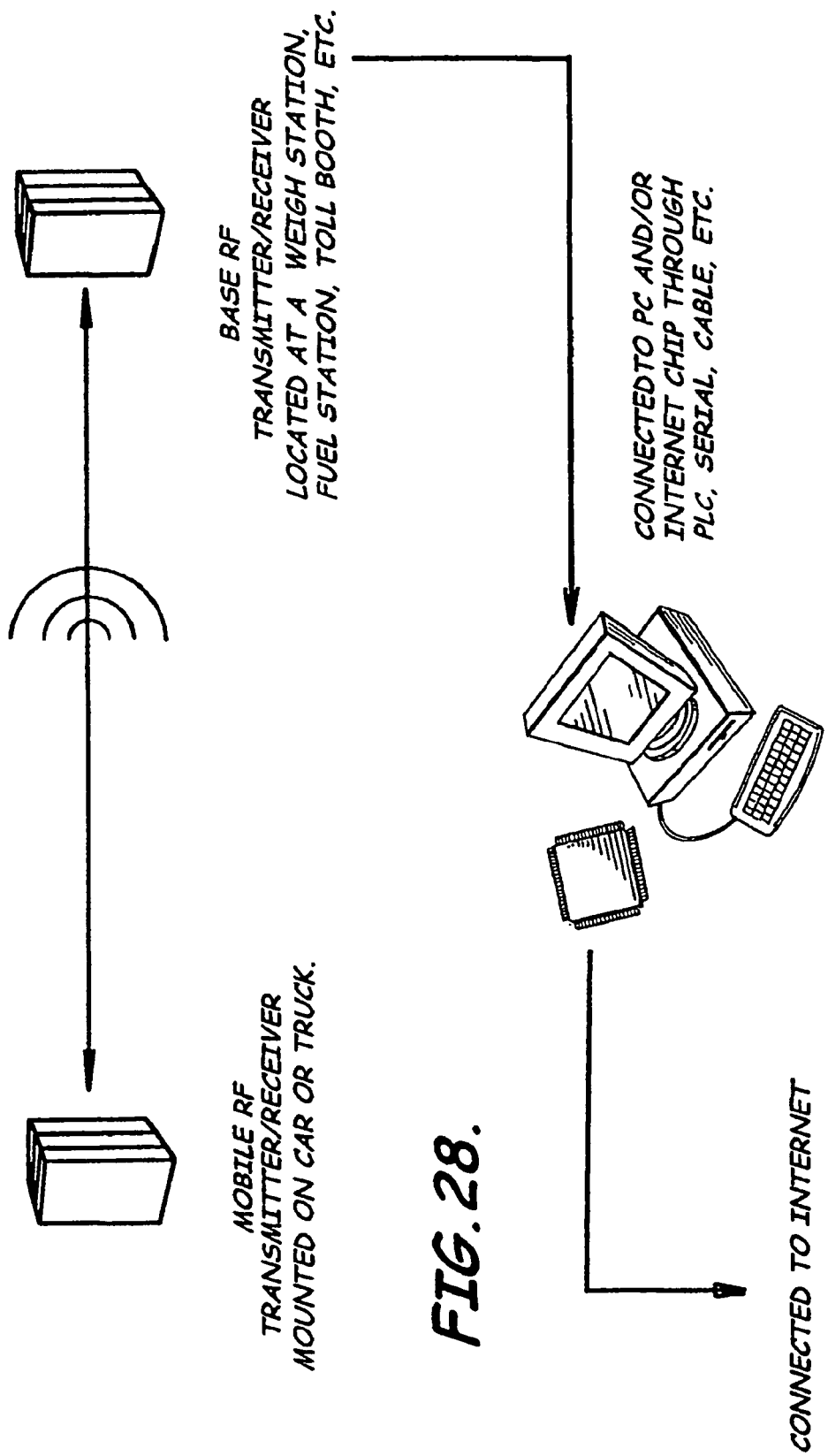
FIG. 28 is a schematic view of an apparatus for data communications having a mobile radio frequency transmitter and receiver mounted on a truck or automobile and a remote base radio frequency transmitter and receiver adapted to be positioned in a remote location such as a weigh station, a fuel station, or a toll booth and which is then connected to a remote data communications terminal positioned to communicate to a communications network such as the Internet according to a seventeenth embodiment of the present invention.
Figure 29:
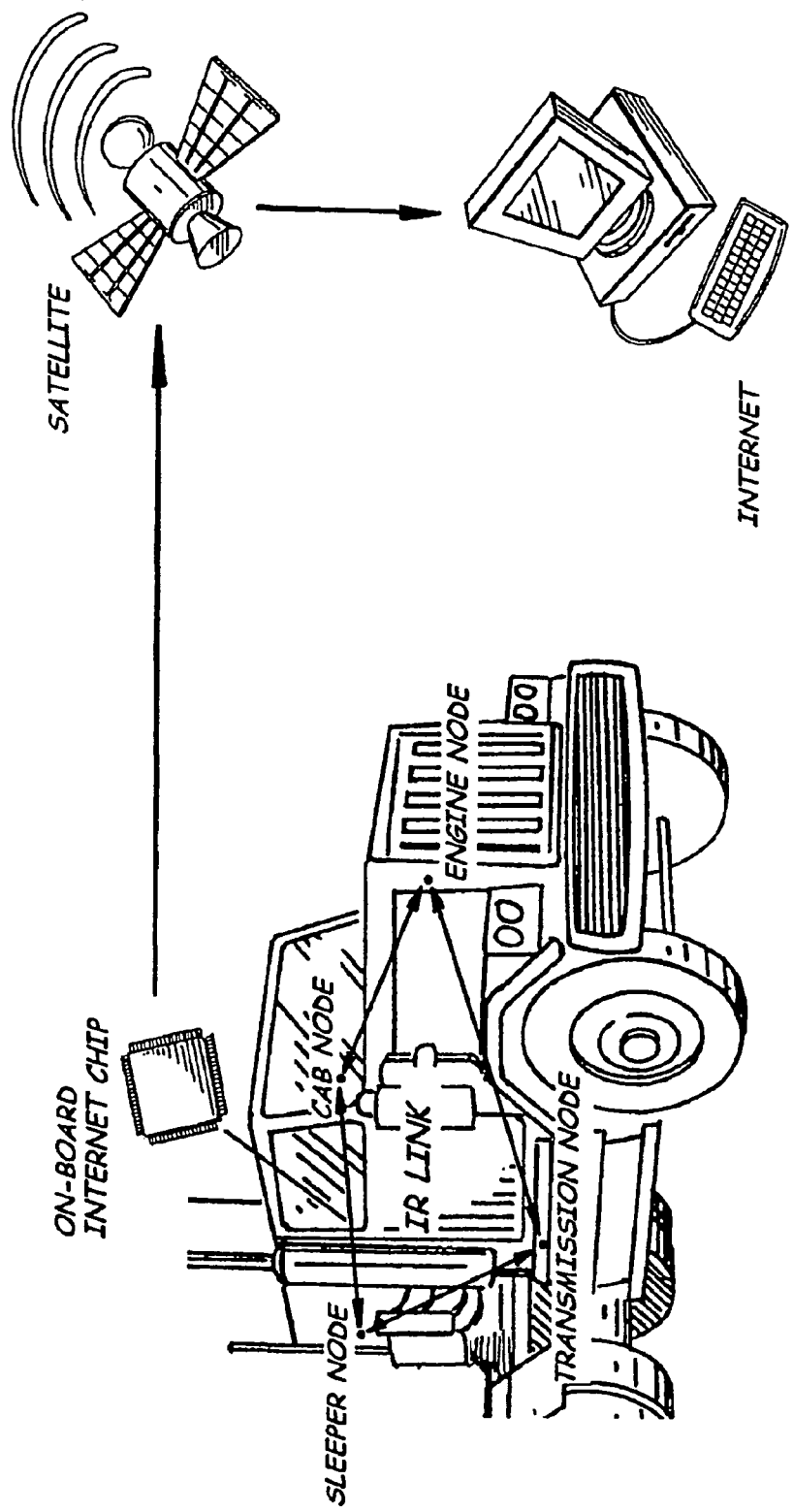
FIG. 29 is a schematic view of a system for data communications between portions of a vehicle and a communications network using an infrared link and to a remote data terminal through the communications network according to a fifteenth embodiment of the present invention.
Figure 30:
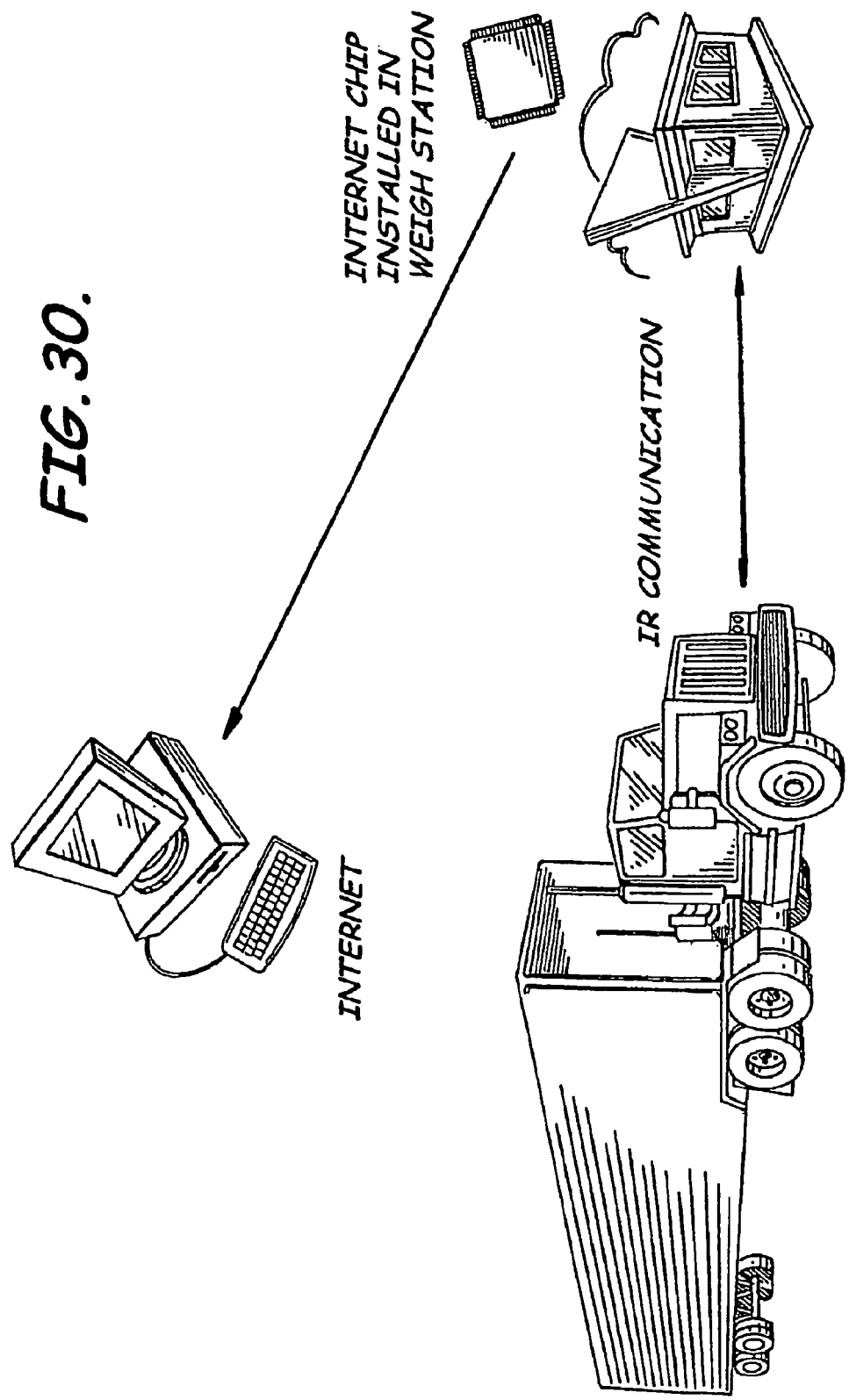
FIG. 30 is a schematic view of a system for data communications between a vehicle and a remote data terminal or communications network using an infrared link and then to remote data terminal through the communications network according to a sixteenth embodiment of the present invention.
Figure 31:
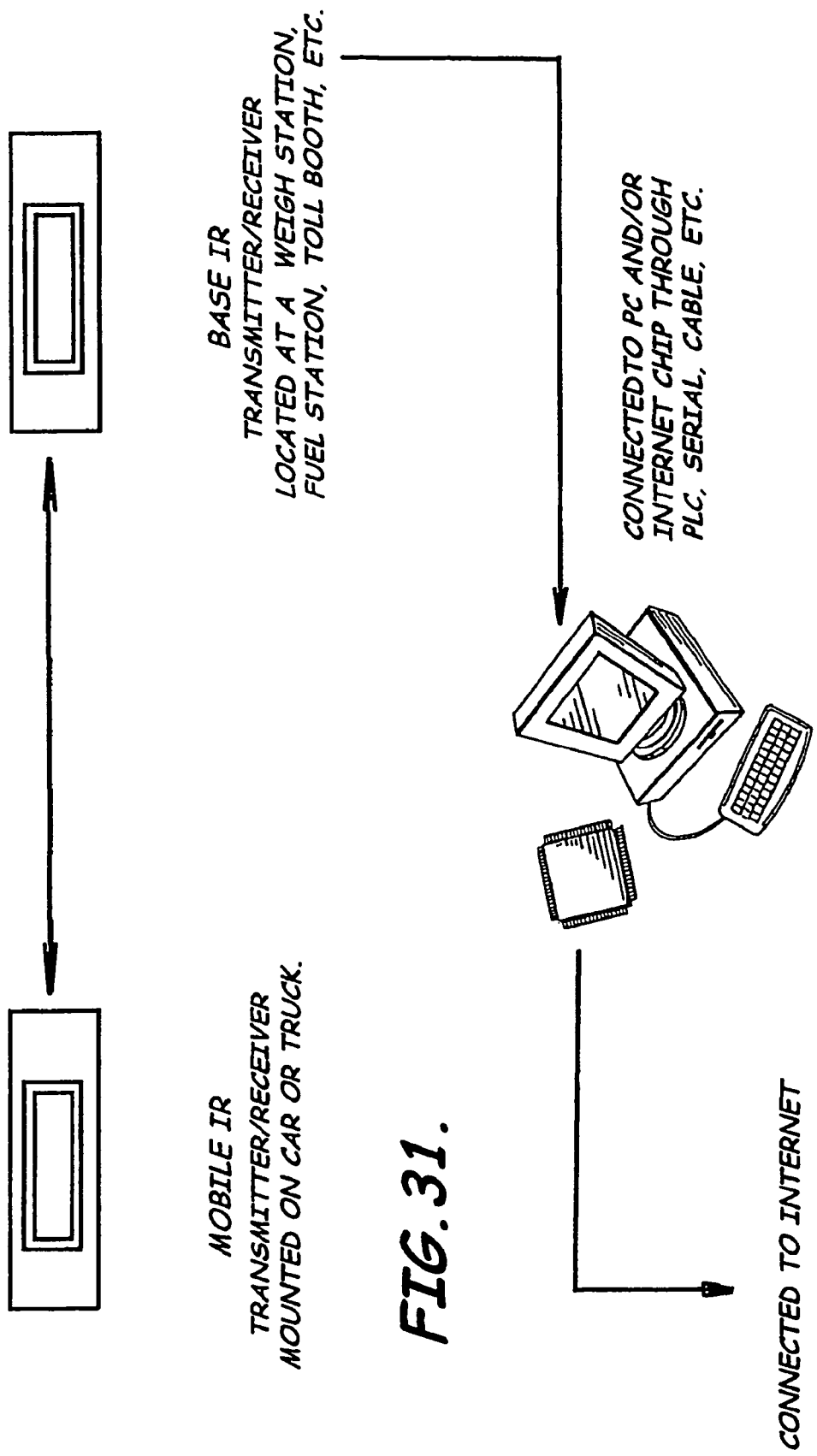
FIG. 31 is a schematic view of an apparatus for data communications having a mobile infrared transmitter and receiver mounted on a truck or automobile and a remote base infrared transmitter and receiver adapted to be positioned in a remote location such as a weigh station, a fuel station, or a toll booth and which is then connected to a remote data communications terminal positioned to communicate to a communications network such as the Internet according to a seventeenth embodiment of the present invention.
Figure 32:
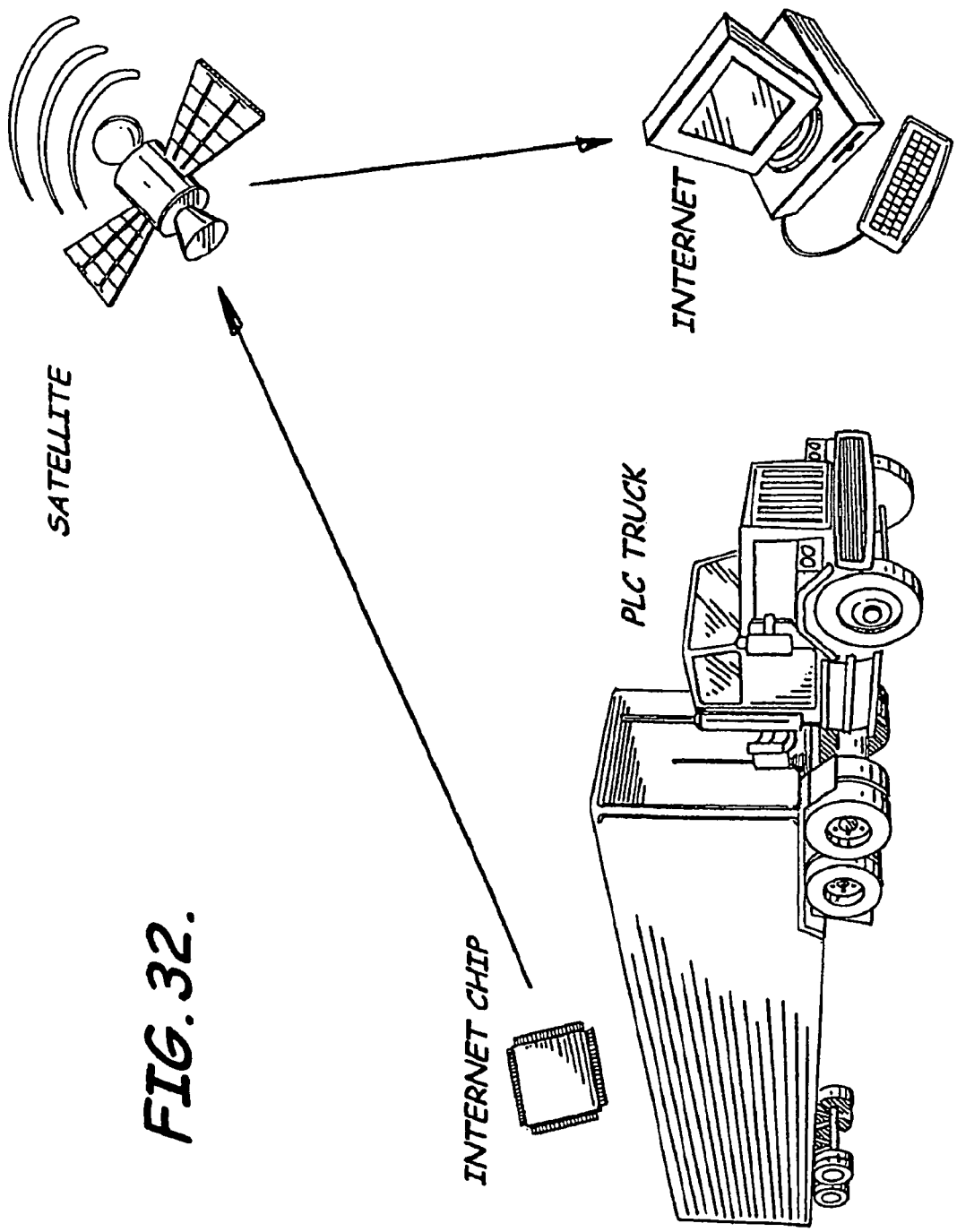
FIG. 32 is a schematic view of a system for data communications to a remote data terminal using a communication network module mounted to a vehicle according to an eighteenth embodiment of the present invention.
Figure 33:
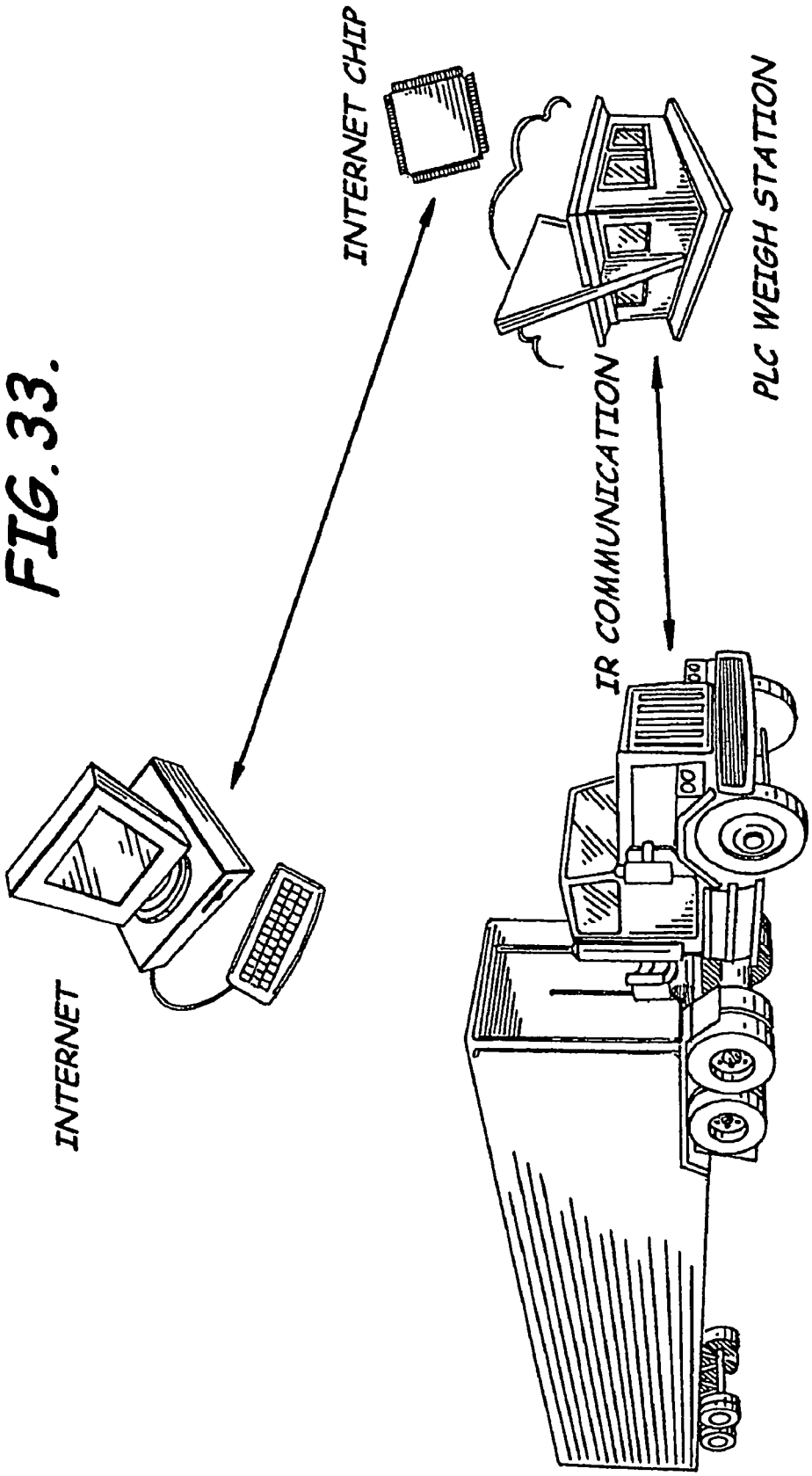
FIG. 33 is a schematic view of a system for data communications between a vehicle and a communications network using an infrared link where the communications network is located at a weigh station having a power line carrier interface and a link to a communications network through a network module such an Internet chip according to a nineteenth embodiment of the present invention.
Figure 34:
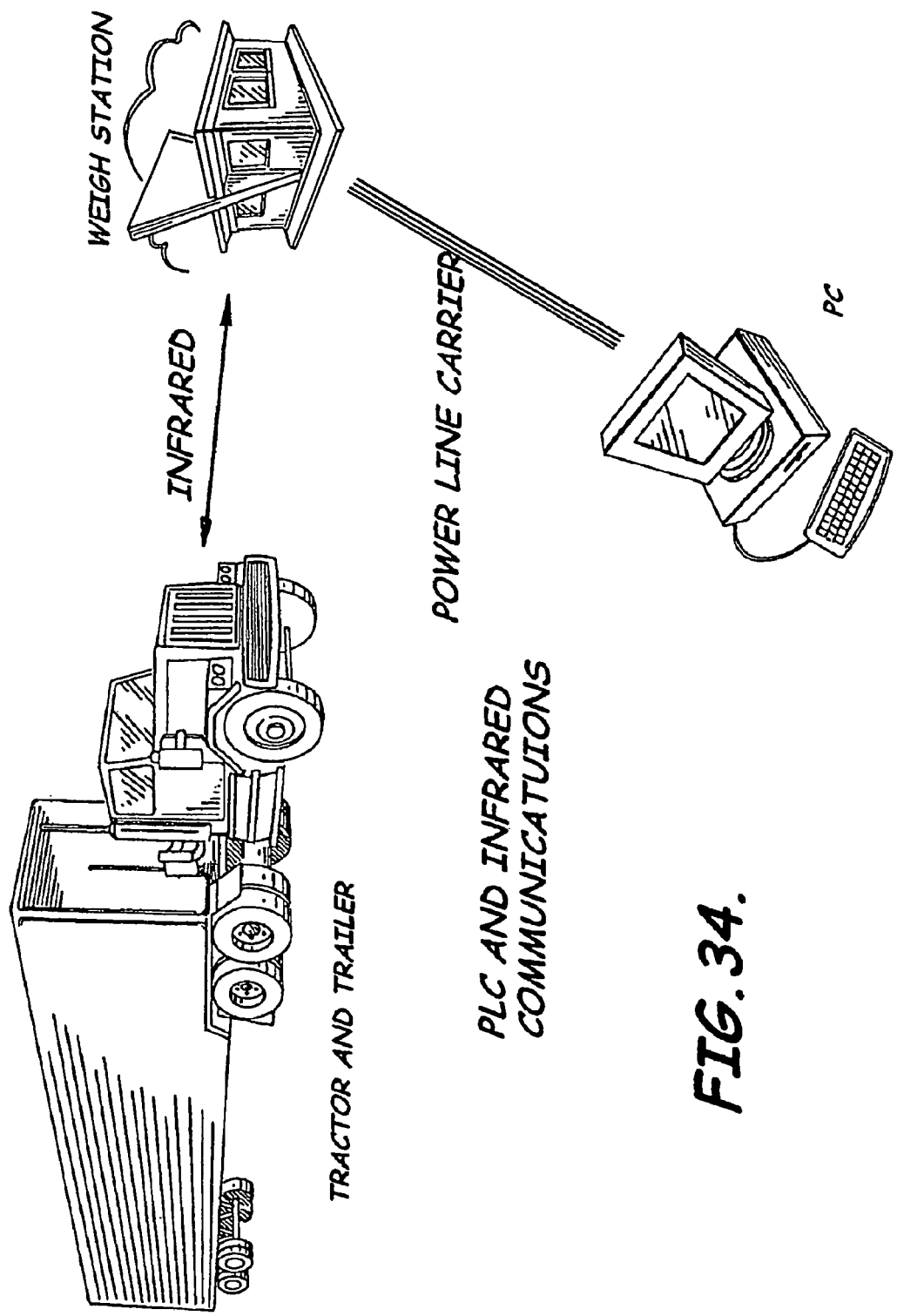
FIG. 34 is a schematic view of a system for data communications between a vehicle and a remote communications network using an infrared link where the communications network is located in a weight station and the communications network has a power line carrier interface to a remote data communications terminal according to a twentieth embodiment of the present invention.
Figure 35:
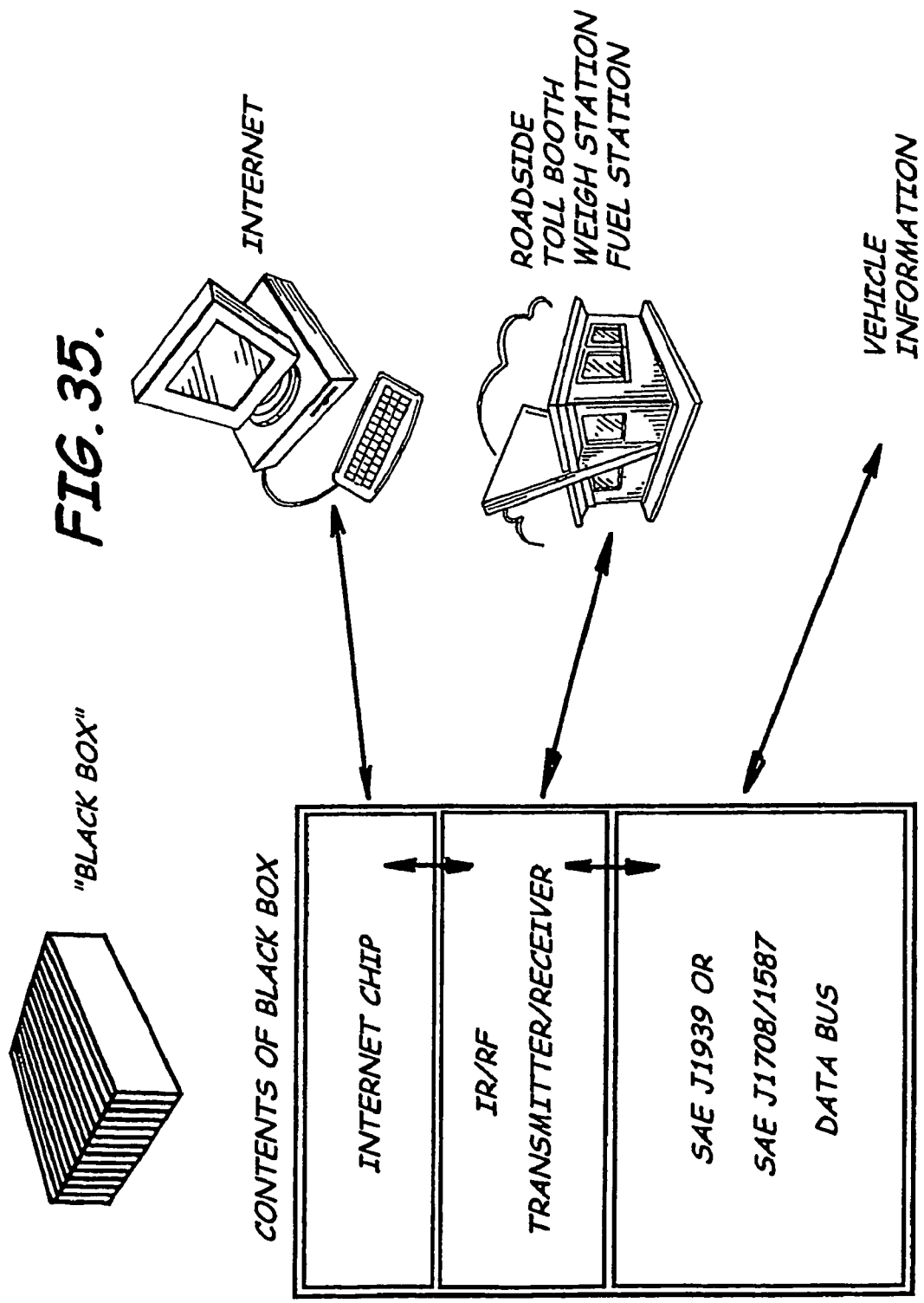
FIG. 35 is a schematic view of an apparatus for data communications to be mounted to a vehicle having a communications protocol interface for a vehicle, a communications protocol for transmitting to a remote data communications terminal or communications network, and for communicating to a remote communications network such as the Internet according to a twenty-first embodiment of the present invention.
Figure 36:
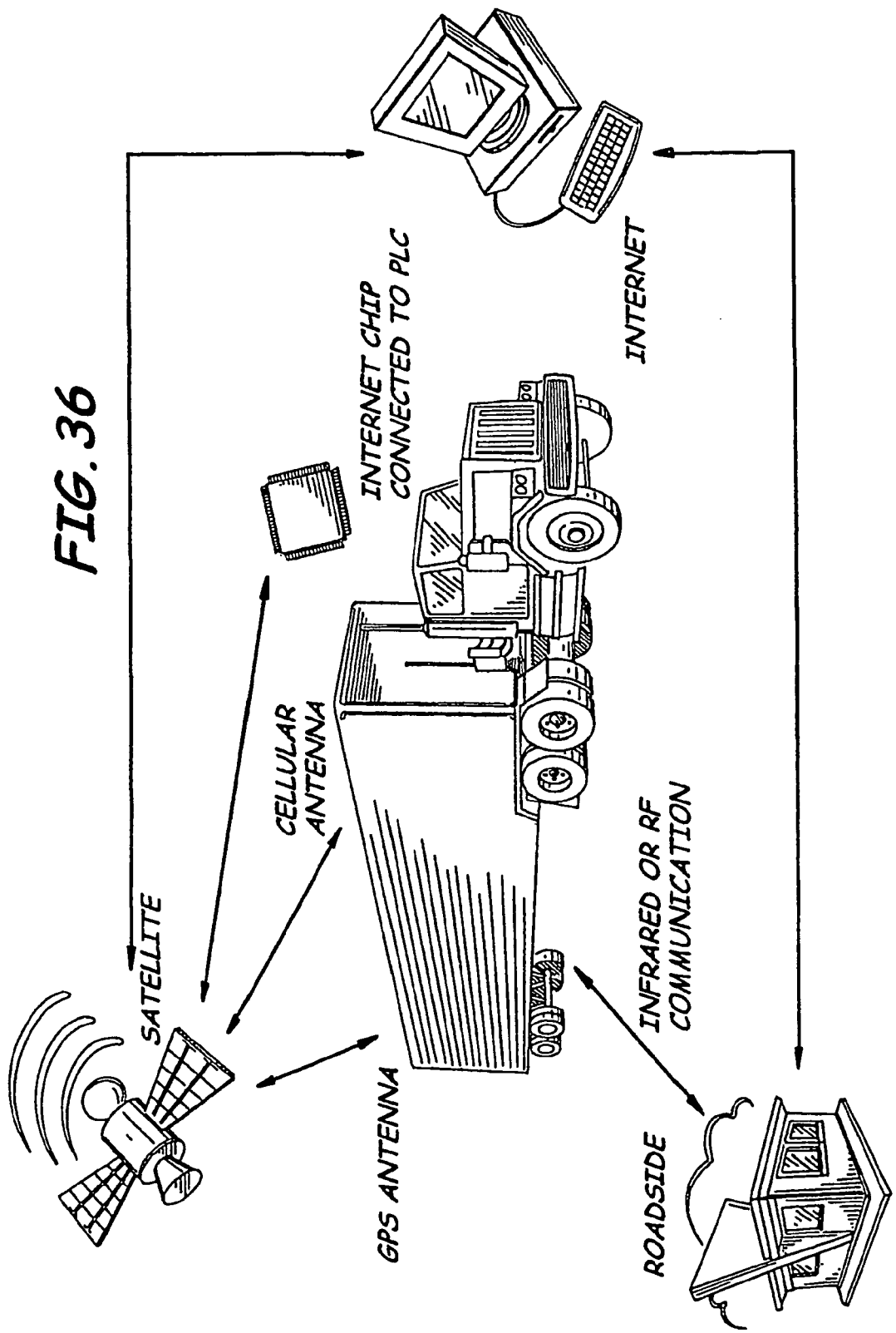
FIG. 36 is a schematic view of a system for data communications between a vehicle having a power line carrier communication link and having mounted thereto communication to a remote data communications terminal using either an infrared or radio frequency link in communication with the power line carrier communication link, to a communications network using a communications network module such an Internet connected to the power line carrier communication link, to a cellular communications link having a cellular communications module in communication with the power line carrier communications link, and a positioning system data communications network in communication with the power line carrier communications link according to a twenty-second embodiment of the present invention.

FIGS. 1-3 illustrate an apparatus 30 for data communications associated with a vehicle 20, such as a tractor/trailer combination or tractor/trailer truck of a heavy duty vehicle(s), according to a first embodiment of the present invention. As understood by those skilled in the art, the tractor/trailer combination preferably includes a tractor 21 connected to a trailer for pulling the trailer 25. The tractor 21 and trailer 25 include respective frames and coupling means or couplers for coupling the trailer 25 to the tractor 21. In addition, the tractor 21 includes an engine, such as a diesel engine or other motor, for moving the tractor 21 to thereby pull the trailer 25. Although the present invention is particularly advantageous to heavy duty vehicles, it will also be understood by those skilled in the art that other types of vehicles, such as a recreational vehicle, agricultural tractors or other heavy duty vehicles used in association with agricultural uses, automobiles, e.g., sedans, sports cars, luxury cars, race cars, train cars, pick-up trucks, sports recreations vehicles, and boats can also be used according to the present invention.

The data communications apparatus 30 preferably includes at least one electronic subsystem 40 associated with the vehicle 20. The at least one electronic subsystem 40, for example, can include an anti-locking brake system ("ABS") 41 connected to the vehicle 20. The tractor/trailer combination or other vehicle, however, preferably includes a plurality of electronic subsystems associated with tractor 21 and/or trailer 25. The electronic subsystems 40 preferably produce data or includes some type of signal generating means, e.g., preferably provided by a signal generator 42. Some examples of these electronic subsystems 40 and features which may be controlled and/or monitored by the apparatus of the present invention are illustrated for a tractor/trailer combination in Table I and for an agricultural tractor in Table II shown on the following pages:

TABLE I

| TRACTOR | TRAILER |
| --- | --- |
| Mirror Tracking | Reefer Temperatures |
| Mirror with Trailer Display | Reefer Pressures |
| Controls for Reefer (Engine) | Trailer Identification |
| Controls for Trailer Slide | Blind Spot Warning |
| Axle | Cargo Information |
| Controls for Landing Gear | Smoke/Fire Detection |
| Active Faring | Overfill (Tanker) |
| Recorder for Trailer Functions | Cargo Shift |
| Satellite for Trailer Functions | Weight Detection |
| Brake System Information | Anti Lock Failure |
| Brake By Wire | Brake By Wire |
| Climate Controls for Reefer | Backup Lamps |
| Fuel Levels | Suspension Control |
| Oil Levels | Sliding Axle Control |
| Engine Temperature | Liftable Tailgate |
| Battery Voltage Levels | Time Pressure Monitor |
| Heating, Ventilation and Air | Lamp Outage Monitor |
| Conditioning Functions | Stop Lamp Saver |
|  | (with Doubles and Triples) |
| Transmission System Functions | Water in Air Reservoir |
| Lighting System Functions | Liftable Landing Gear |
| Vehicle Speed | Brake Temperature |
| Engine Speed | Emergency Line Pressure Detection |
| Mirror with Trailer Display | Vehicle Identification |
| Trailer Identification | Blind Spot Warning |
| Trailer Brake Temperature | Cargo Information |
| Trailer Axle Temperatures | Time Pressure Warning |
| Trailer Security | Smoke Detector |
| Weight Broadcast | Roll Over Protection |
| Trailer Voltage Status | Active Conspicuity (Lighting) |
| GPS | Active Tire Pressure |
| (Satellite Control to Implement) | |
| Vehicle Identification | |
| Backup Alarm | |
| Inventory Data Collection | |
| Security Warning | |
| Trailer Engine Start | |
| Trailer Engine Monitor | |
| Tractor/Changing from Reefer | |
| Trailer Dome Lamps | |
| Rear Door Lift (Motorized) | |
| Rear Door Status | |

TABLE II

| TRACTOR | IMPLEMENT |
| --- | --- |
| Vehicle Speed Optimization | Sprayer Pressure |
| Engine Speed Optimization | Speed Planning Rates |
| Implement Display | Depth Position |
| GPS (Satellite Control to Implement) | Hydraulic Controls |
|  | Speed Counting |
|  | Moisture Sensing |

The data communications apparatus 30 also preferably includes a plurality of electrical conductors 38, e.g., preferably provided by twisted pair wiring as understood by those skilled in the art, or other conductor configurations such as single wire, which are preferably connected to the plurality of electronic subsystems 40 and associated with the vehicle 20.

The plurality of electrical conductors 38 preferably provide one or more data communications channels paths for data or communications with the electronic subsystems 40, as well as a controller 45 as described further below herein. For example, data can be directly communicated, e.g., on/off, status, threshold levels, RS-232, or RS-485 protocols, through the conductors or power line carrier ("PLC") communication protocols such as Spread Spectrum, e.g., CEBus, X-10, such as offered by Cogency Semiconductor, Inc. of Canada or Intellon Corp. of Ocala, Fla. or other protocols along the conductors as understood by those skilled in the art.

As perhaps best illustrated in FIGS. 5 and 11, the data communications apparatus 30 preferably also has vehicle data communications protocol converting means 33, 33', e.g., preferably provided by a vehicle data communications protocol converter as illustrated by first and second data communications protocol converters 37, 39, 37', 39' and a first signal booster 36, 36', connected to the plurality of electrical conductors 38, 38' for converting a first data communications protocol associated with data communications along the plurality of electrical conductors 38, 38' to a second data communications protocol. As understood by those skilled in the art, the first data communications protocol is preferably according to SAE J1708, but also could be according to SAE J1939, SAE J1587, RS-485, or power line carrier ("PLC") protocols as well. In other words, the first data communications protocol is preferably an existing data communications protocol associated with a vehicle 20. The first data communications protocol converter 37 is preferably an RS-485 transceiver, as understood by those skilled in the art, which transmits and receives data communications according to the J1708 or other protocols to the plurality of conductors 38 and transmits and receives data communications according to the RS-485 protocol to the second data communications protocol converter 39 and vice-versa. Other data communications protocols such as global communications network, e.g., Internet, protocol can be used as well according to the present invention. A through-the-air data communications protocol, however, can be particularly advantageous so that a driver or passenger does not have to exit a vehicle, locate a cable, and connect it to a vehicle and yet can accomplish accurate and efficient data communications.

Additionally, the vehicle data communications protocol converting means 33 can convert the first data communications protocol, e.g., SAE J1708, into a third data communications protocol, e.g., RS-485, and then convert the third data communications protocol, e.g., RS-485, into yet the second data communications protocol, e.g., IrDa or other infrared or RF data communications protocol such as Bluetooth, 802.11 Standard, or other RF data communications protocols, or a designated communications network protocol such as the Internet, which is used to transmit data through-the-air to a remote data communications terminal 60, 60' (see FIGS. 5 and 11). The second data communications protocol converter 39 preferably is a combination of a microprocessor or other microcontroller connected to the RS-485 transceiver which transmits and receives logic level signals and an infrared IrDA compliant integrated circuit, such as provided by Hewlett Packard or Rohm as understood by those skilled in the art, connected to the microprocessor which transmits and receives the logic level signals, a Bluetooth, 802.11 Standard or other RF data communications protocol compliant integrated circuit, or a designated communication network, such as the Internet, compliant integrated circuit, such as provided by Zilog, e.g., the eZ80 Webserver, as understood by those skilled in the art.

When transmitting from the vehicle 20, the IrDA compliant integrated circuit receives logic levels from the microcontroller and converts the logic levels to IrDA data communications protocol based upon timed infrared pulse signals of a predetermined position, pulse widths, and/or duration depending on the desired baud or bit rate of data communications. The IrDA integrated circuit also receives an infrared data communications protocol and transmits logic levels when receiving data communications from a remote data communications terminal 60. The IrDA integrated circuit can include a built-in infrared transceiver 35, e.g., an infrared light emitting diode and an infrared photodetector or photodiode. At least the infrared light emitter or light emitting diode, however, is preferably not built into the IrDA integrated circuit because the vehicle data communications protocol converting means 33 also preferably includes the first signal booster 36. If infrared is used, for example, an infrared transceiver or emitter/detector pair such as provided by Sharp Corp., namely the Opto-Electronic Devices Division such as Model No. GP2W0004YP.

If infrared is one or more of the first, second, or third data communications protocol as described herein, then preferably one or more coverings to effect shading and/or filtering of a receiver or detector portion of an infrared transceiver is preferably used to reduce any impact or interference from station, room or other lights which may emit infrared or near infrared wavelengths of light and to increase the ease and clarity of recognition of a data communications signal. The covering, for example, can be a hood or cup formed closely adjacent at least a portion of the receiver or detector other than the standard encapsulation of the receiver or detector so that the potential interfering light is shaded out or reduced so that it is not directed toward the receiver as much. In addition to or as an alternative, different filtering techniques can be used as well such as covering the receiver with a lens or other filter which assists in enhancing data communication signal recognition, especially in environments which may otherwise cause signal recognition to be somewhat difficult. For example, an infrared receiver or detector can have a standard encapsulation and then according to the present invention a lens or protective covering can be used to overlie or surround the encapsulated receiver or detector. Then still, a hood, cup, or other protective and shading member can be used to further shade or cover the lens to yet further reduce interference from room, station, or other lights or to enhance signal recognition.

The second data communications protocol is preferably one of either an infrared data communications protocol, an RF data communications protocol, or a designated communications network protocol such as the Internet. In other words, the second data communications protocol is preferably a through-the-air type of data communications protocol which does not require equipment to be coupled to the vehicle 20 when obtaining data therefrom or monitoring vehicle operational conditions. If the data communications is according to an RF data communications protocol as illustrated in FIG. 11, then the second data communication protocol converter 39' preferably includes an RF data communications integrated circuit or analog circuit as understood by those skilled in the art which receives and transmits logic levels to a microprocessor or microcontroller and transmits and receives RF data communications according to predetermined RF data communications protocol, e.g., a simple modulation scheme or a more complex protocol such as CEBus as understood by those skilled in the art.

Additionally, particularly on the transmit portion of the vehicle data communications converting means 33, the converting means 33 also preferably includes a signal booster 36, e.g., preferably provided by amplification circuitry and/or power boosting circuitry, which advantageously boosts the transmit signal to thereby increase the successful transmit range of the associated transmit portion of the transceiver 35.

An infrared data communications protocol, such as IrDA as understood by those skilled in the art, can be particularly advantageous in association with vehicles for numerous reasons. For example, dirt, dust, grime, corrosive atmospheres, vibration, rough handling, or other obstacles can often be readily overcome with appropriate design of the driving and receiving electronics. Also, infrared data communications is immune from electro-magnetic interference ("EMI") which, as understood by those skilled in the art, can impact other types of data communications media. Further, infrared data communications would not interfere with other type of through-the-air data communications channels such as RF data communications.

If an RF data communications protocol is used, as understood by those skilled in the art, then the RF data 25 communications protocol preferably has designated bandwidths or other techniques used to reduce noise.

As illustrated in FIGS. 1-2 and 4, a connector 50 is preferably connected to the plurality of electrical conductors 38. The connector 50 can also be connected to 30 one or more of the electronic subsystems 40, e.g., an ABS system, preferably through the electrical conductors 38. For example, the connector 50 can be a six-pin Deutch connector or other well known connector associated with trucks or other vehicles (see FIG. 4). The connector 50, in a first embodiment, also can be advantageously positioned in the cab 23 of the tractor 21 of the truck (see FIGS. 2-3). This location, for example, is a secure position for a transceiver 35, as described further below herein, because the cab 23 can be locked and a security alarm system or other security system can be associated with the cab 23. Additionally, the cab 23 provides a convenient position for the driver, government officials, or others involved in the related industry to provide access to operational conditions of the vehicle 20. This further takes advantage of existing positions of vehicle connectors to tap into or access the plurality of electrical conductors 38 which provide data or information to the cab of the tractor without requiring extensive rewiring, retrofitting, or adding expensive equipment to the vehicle 20.

As perhaps best illustrated in FIGS. 8-10, in a second embodiment of the connector 50', for example, the connector 50' can be positioned more closely in association with one of the electronic subsystems 40 such as the ABS system of the trailer 25 of the truck. The second embodiment also illustrates a connector 50' known to those in the vehicle art, and namely the trucking industry. This connector 50', however, is advantageously modified by adding a transceiver housing 34 and a transceiver 35 as described further below herein. In each of the first and second embodiments, the connector 50, 50' preferably includes a plurality of pins 55 having a predetermined pin configuration.

The connector 50, 50' also preferably has one of either a generally cylindrical or a generally rectangular shape.

The connector 50, 50' also preferably has first and second mating connector portions 51, 52, 51', 52' which are joined together by a frictional fit so that the plurality of pins 55 are matingly received into a corresponding plurality of contact elements 56. As understood by those skilled in the art, the connector 50, 50' can also have some type of connector aligning means associated therewith for readily aligning the first and second mating connector portions 51, 52, 51', 52'.

A transceiver housing 34 is preferably detachably connected to the connector 50, 50'. The transceiver housing 34, 34' also preferably includes a translucent cover member 31 for transmitting the second data communications protocol therethrough. In a first embodiment of the transceiver housing 34, the transceiver housing 34 can either include the second mating connector portion 52 being formed as a portion of or integrally as a single piece therewith, or the second mating connector portion 52 can define the transceiver housing 34. The transceiver housing 34 in this embodiment likewise preferably has one of either a cylindrical or a rectangular shape. The transceiver housing 34 preferably includes or has integrally formed as one piece therewith an optically translucent cover member 31 for transmitting and receiving infrared or RF data communications therethrough to the remote data communications terminal 60. Advantageously, because the transceiver housing 34 forms a portion of or readily attaches to a standard vehicle connector, e.g., the first mating connector portion 51, the data communications apparatus 30 is readily adapted to existing vehicle data communication technology and does not require either extensive retrofitting or extensive and expensive additions to existing vehicle data communication technology.

As perhaps best illustrated in FIGS. 6-7, in a second embodiment of the transceiver housing 34', the transceiver housing 34' can advantageously be a vehicle light housing mounted to the vehicle 20 for housing a vehicle light. The vehicle light housing, for example, can advantageously be a side-marker light housing mounted to the trailer 25 of a truck so that a third party would not readily recognize that the truck is equipped with the data communications apparatus 30.

A transceiver 35 is preferably positioned within the transceiver housing 34, 34' and connected to the vehicle data communications protocol converting means 33 for transmitting the second data communications protocol from the vehicle 20 and receiving the data communications protocol from a remote data communications terminal 60. For infrared data communications, for example, the transceiver 35 (see also FIG. 4) preferably includes a plurality of infrared light emitter or light emitting diodes, a plurality of infrared photodiodes, and associated drive and amplification circuitry as understood by those skilled in the art.

As also understood by those skilled in the art, the transceiver 35 is preferably only a physical layer signal processing transceiver, e.g., infrared or radio frequency, and preferably includes a combination transmitter and receiver which collects data or information from the various subsystems and communicates the data to one or more remote data communications terminals 60. It will be understood by those skilled in the art that the apparatus is not limited to communication by a physical layer signal processing transceiver, but that other communication protocol techniques can be used as well. The transceiver 35 is preferably a first transceiver 35, and the one or more remote data communication terminals 60 preferably each include a second transceiver 65, 65' for transmitting the second data communications protocol to the first transceiver and receiving the second data communications protocol from the first transceiver 35. The second transceiver 65, 65' is preferably similar to the first transceiver 35 as described herein above and accordingly for brevity will not be repeated herein.

The first and second transceivers 35, 35', 65, 65' also each include a signal processing physical layer. Advantageously, the second data communications protocol only uses the physical layer of the first and second transceivers 35, 65 for signal processing and not a data link layer ("DLL") as understood by those skilled in the art. By only using the physical layer for signal processing, the data communications and coding or modulation schemes for the communications is greatly simplified and the data conversion from one data communications protocol to another data communications protocol is also simplified.

The remote data communications terminal 60 is preferably a computer, e.g., provided by a portable laptop or handheld computer, or other portable or substantially stationary remote data collection stations as understood by those skilled in the art.

The remote data communications terminal, for example, can be positioned at one or more locations where a vehicle 25 owner, another vehicle, security system, or other data collection point such as an entrance to a shop, station, or fuel island desires to collect data.

The second transceiver does not need to be near or adjacent the computer or other terminal itself as long as the second transceiver is positioned to receive the second data communication protocol from the vehicle. The remote data communications terminal 60 also includes remote data communications protocol converting means 63, e.g., preferably provided by a remote data communication protocol converter as illustrated by the third data communications protocol converter 69 and the second signal booster 66, for converting the second data communications protocol received by the remote data communications terminal to a third data communications protocol associated with the computer. The third data communications protocol, for example, can be RS-232, RS422, RS-423 or other data communications protocol, as understood by those skilled in the art. If two conversions occur in the vehicle data converter 33, e.g., RS-485 to RS-232 and RS-232 to IrDA or RF, then the third data communications protocol would actually be yet a fourth data communications protocol as sequentially illustrated in FIGS. 5 and 10. The remote data communications protocol converting means 63, e.g., a remote data communications protocol converter, also preferably includes data signal boosting means, e.g., a second signal booster 66 similar to the first signal booster 36 as described above herein, for boosting the range of the signal between the remote data communications terminal 60 and the first transceiver 35 of the data communications apparatus 30 to thereby increase the effective range of transmission for which the apparatus 30 is anticipated to be used. The remote data communications terminal also preferably includes a predetermined data communications protocol transceiver 61, 61', e.g., preferably provided by an RS-232 transceiver or other type of transceiver as understood by those skilled in the art, as a data communications interface to the personal computer 68 or other data terminal.

The data communications apparatus 30 according to the present invention preferably also includes at least one controller 45 connected to the at least one electronic subsystem 40 and the plurality of electrical connectors 38 for controlling data communications along the plurality of electrical conductors 38, e.g., to and from the electronic subsystem(s) 40. As understood by those skilled in the art, the controller 45 preferably includes a microprocessor or microcomputer operating under stored program control to perform various functions related to the monitoring and control of various electronic subsystems on either or both of the tractor 21 and trailer 25 or to the remote data communications terminals 60.

As set forth previously above, each electronic subsystem 40 to be controlled and/or monitored preferably includes signal generating means, e.g., preferably provided by a signal generator, connected to the controller 45 for generating a signal related to the operation of the vehicle 20. The controller 45, for example, produces or outputs a number of digital or analog output controls in the form of relay contact closures or other signals to either the subsystems or to the transceiver 35. The controller 45, for example, can also be an ABS controller which actuates control valves on the trailer 25 to control the brake chambers of the brakes associated with the trailer 25.

Alternatively, as illustrated in FIGS. 12-36, the apparatus also provides communication between vehicles, from portions of a vehicle, e.g., within nodes, and communication to other communication networks such as in a building or a global communications network.

In these embodiments, a vehicle, such as a tractor-trailer combination which is actually two vehicles, e.g., a tractor 135 and a trailer 140, communicates with another vehicle, namely a security vehicle such as a law enforcement or police vehicle 160 (see FIGS. 12-13 and FIGS. 14-15). In these embodiments, for example, a first infrared or RF transceiver preferably is advantageously mounted to a trailer 140 (or a tractor 135) for communication with the security vehicle 160 using wireless data communications. The security vehicle 160 then has a second infrared or RF transceiver mounted thereto for wireless data communications between the vehicles.

In this manner, the security vehicle 160, for example, can gather information such as vehicle identification data, secure information such as vehicle and/or cargo weight, driver registration information, cargo contents, or operation characteristics of the vehicle without the need to stop the vehicle. This, in turn, provides an added level of security to highway or other roadway travel, especially in the event of a stolen, unauthorized, hijacked, or other potentially dangerous or hazardous situation. In these embodiments, the security vehicle 160 is preferably equipped with a remote data communications terminal or other data collection, gathering, or transmitting device such as mounted to a side panel of a door, positioned in a dashboard region of the security vehicle 160, positioned along one of the windows of the security vehicle 160, or positioned in association with the trunk or engine compartments of the security vehicle 160. The apparatus 130 in these embodiments is preferably substantially similar to the one described in the above embodiments and can be positioned in a light marker housing or other housing for communication between vehicles.

In addition, such as shown in FIGS. 16-19, the apparatus 130' also includes communications between a tractor and a trailer as two separate vehicles or as a combination of one vehicle. In these embodiments, a first transceiver preferably is mounted to the rearward portions of the tractor and a second transceiver preferably is mounted to the forward portions of the trailer so that the distance between the transceivers is minimized and be readily ascertainable. In this manner, a driver can monitor the contents of the trailer without having to leave his seat to physically inspect the trailer. The driver can also be made aware of various trailer conditions. In turn, the tractor can have a remote data terminal positioned therein so that the trailer has the first data communications protocol in a network within the trailer, the first data communications protocol is converted to the second data communications protocol for a through the air wireless communication between the trailer and the tractor, the tractor receives the second data communications protocol, and then converts it to a third data communications protocol for a remote terminal such as positioned in the cab of the tractor for displaying, viewing, and interfacing with the driver or passenger. Also, for example, a high speed and a low speed data communications protocol such as PLC can coexist. on the same power lines. Also, two or more low speed data communications protocols, such as CEBus and PowerBus, can coexist on the same lines if desired as a PLC communications. At low speed, although there may be a certain amount of conflict between the communication protocols, the communication protocols preferably share the available bandwidth where coexistence is desired or occurs. Adding PowerBus nodes to a CEBus network will reduce the throughput of the CEBus network, but should not result in communication failures using either technology. Although lower speeds, e.g., less than 100 kilobits per second (Kbps), may be desired due to lower cost and increased reliability for certain types of communication, but higher speeds, e.g., greater than 100 Kbps can be used as well according to the present invention. Higher speeds, for example, are particular applicable to shared broadband access, low-latency audio and video streaming, and high reliability using high speed PLC integrated circuit or chip sets such as provided by Cogency Semiconductor, Inc. of Canada or Intellon Corp. of Ocala, Fla. More preferably, these higher speeds are even higher than 10 Megabits per second (Mbps). The higher speed PLC, for example, can use orthogonal frequency-division multiplexing signal processing over power lines as understood by those skilled in the art and can be used as an alternative to lower speed PLC or, more preferably, in conjunction with lower speed PLC. When used in conjunction with the lower speed PLC, the higher speed PLC is preferably positioned in the same controller, but two separate controllers can be used as well as understood by those skilled in the art.

As illustrated in FIGS. 1-36, the present invention also includes methods of data communications associated with a vehicle 20. The method preferably includes providing a plurality of electrical conductors 38 associated with a vehicle 20 and converting a first vehicle data communications protocol associated with data communications along the plurality of electrical conductors 38 to a second data communications protocol. The method also includes transmitting the second data communications protocol from the vehicle 20 to a remote data communications terminal 60. The first data communications protocol is preferably either SAE J1708 or SAE J1939. The second data communications protocol, on the other hand, is preferably one of either an infrared data communications protocol or an RF data communications protocol.

The method can also include receiving the second data communications protocol from the remote data communications terminal 60, controlling data communications along the plurality of electrical conductors 38, and generating a signal related to the operation of the vehicle 20. For example, the remote data communications terminal 60 can be a computer, and the method can include remotely converting the second data communications protocol received by the remote data communications terminal 60 to a third data communications protocol associated with the computer.

The method additionally can include positioning a connector 50 so as to be connected in series with the plurality of electrical conductors 38, positioning a transceiver 35 in association with the connector 50, detachably connecting a transceiver housing 34 to the connector 50, and positioning the transceiver 35 within the transceiver housing 34. The transceiver housing 34 preferably includes a translucent cover member 31 for transmitting and receiving the second data communications protocol therethrough.

The method can still further include providing at least one electronic subsystem 40 associated with the heavy duty vehicle 20 and connected to the plurality of electrical conductors ~8 related to operation of the vehicle 20. The transceiver 35 is preferably a first transceiver, and the remote data communication terminal 60 includes a second transceiver 65. The method also includes transmitting the second data communications protocol to the first transceiver 35 and receiving the second data communications protocol from the first transceiver 35. The first and second transceivers 35, 65 each preferably include a physical layer, and the method further includes transmitting and receiving the second data communications protocol only using the physical layer of the first and second transceivers 35, 65.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. In a vehicle comprising a data communications apparatus for communicating vehicle data to a remote data communications terminal, said vehicle data being selected from a group consisting of tire data, tire pressure data, engine temperature data, vehicle identification data, battery voltage data, and reefer data; said data communications apparatus comprising:

at least one electrical conductor associated with said vehicle;

means for converting a first data communications protocol associated with communications of vehicle data along the electrical conductor to a second data communications protocol; and means for wirelessly transmitting said second data communications protocol to the remote data communications terminal.

2. A vehicle comprising a data communications apparatus according to claim 1, wherein said remote data communications terminal comprises a computing device selected from a group consisting of a personal computer, a portable laptop computer, and a handheld computer.

3. A vehicle comprising a data communications apparatus according to claim 1, wherein said vehicle comprises a tractor mechanically coupled to at least one trailer, and wherein said remote data communications terminal is located within at least one of said tractor and said trailer.

4. A vehicle comprising a data communications apparatus according to claim 1, and comprising a connector connected to said electrical conductor, and means adjacent said connector for transmitting vehicle data.

5. A vehicle comprising a data communications apparatus according to claim 4, wherein said means for transmitting comprises a signal processing physical layer, and wherein said second data communications protocol uses only the physical layer of said means for transmitting for signal processing.

6. A vehicle comprising a data communications apparatus according to claim 4, wherein said connector includes a plurality of electrical pins having a predetermined pin configuration.

7. A vehicle comprising a data communications apparatus according to claim 1, wherein said first data communications protocol comprises one of the data communications protocols specified by SAE J1708, SAE J1939, RS 232, RS 485, power line carrier (PLC), and a universal serial bus standard.

8. A vehicle comprising a data communications apparatus according to claim 1, wherein said second data communications protocol comprises one of either an infrared data communications protocol and an RF data communications protocol.

9. A data communications system for communicating vehicle data to a remote data communications terminal, said vehicle data being selected from a group consisting of tire data, tire pressure data, engine temperature data, vehicle identification data, battery voltage data, and reefer data; said data communications system comprising:
  at least one electrical conductor;
  means for converting a first data communications protocol associated with communications of vehicle data along said electrical conductor to a second data communications protocol; and
  means for transmitting said second data communications protocol to the remote data communications terminal.

10. A data communications system according to claim 9, wherein said remote data communications terminal comprises a computing device selected from a group consisting of a personal computer, a portable laptop computer, and a handheld computer.

11. A data communications system according to claim 9, wherein said vehicle comprises a tractor mechanically coupled to at least one trailer, and wherein said remote data communications terminal is located within at least one of said tractor and said trailer.

12. A data communications system according to claim 9, and comprising a connector connected to said electrical conductor, and means adjacent said connector for transmitting vehicle data.

13. A data communications system according to claim 12, wherein said means for transmitting comprises a signal processing physical layer, and wherein said second data communications protocol uses only the physical layer of said means for transmitting for signal processing.

14. A data communications system according to claim 12, wherein said connector includes a plurality of electrical pins having a predetermined pin configuration.

15. A data communications system according to claim 9, wherein said first data communications protocol comprises one of the data communications protocols specified by SAE J1708, SAE J1939, RS 232, RS 485, power line carrier (PLC), and a universal serial bus standard.

16. A data communications system according to claim 9, wherein said second data communications protocol comprises one of either an infrared data communications protocol and an RF data communications protocol.

17. A method for communicating vehicle data to a remote data communications terminal, the vehicle data being selected from a group consisting of tire data, tire pressure data, engine temperature data, vehicle identification data, battery voltage data, and reefer data; the method comprising:
  converting a first data communications protocol associated with communications of vehicle data to a second data communications protocol; and
  transmitting the second data communications protocol to the remote data communications terminal.

18. A method apparatus according to claim 17, wherein the first data communications protocol comprises one of the data communications protocols specified by SAE J1708, SAE J1939, RS 232, RS 485, power line carrier (PLC), and a universal serial bus standard.

19. A method according to claim 17, wherein the second data communications protocol comprises one of either an infrared data communications protocol and an RF data communications protocol.

20. A method according to claim 17, wherein the remote data communications terminal comprises a computing device selected from a group consisting of a personal computer, a portable laptop computer, and a handheld computer.

* * * * *